United States Patent
Shuf et al.

(10) Patent No.: US 6,886,085 B1
(45) Date of Patent: Apr. 26, 2005

(54) METHOD AND APPARATUS FOR EFFICIENT VIRTUAL MEMORY MANAGEMENT

(75) Inventors: Yefim Shuf, Forest Hills, NY (US); Hubertus Franke, Courtlandt Manor, NY (US); Manish Gupta, Peekskill, NY (US); Marc Snir, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/636,049

(22) Filed: Aug. 10, 2000

Related U.S. Application Data

(60) Provisional application No. 60/198,406, filed on Apr. 19, 2000.

(51) Int. Cl.$^7$ .............................................. G06F 12/00
(52) U.S. Cl. ...................... 711/159; 711/143; 711/165; 709/315
(58) Field of Search ................................ 711/159, 143, 711/165, 128, 203, 133–136; 709/315

(56) References Cited

U.S. PATENT DOCUMENTS

| | | | | |
|---|---|---|---|---|
| 5,544,349 A | * | 8/1996 | Berry et al. ................. | 711/165 |
| 5,559,978 A | * | 9/1996 | Spilo .......................... | 711/203 |
| 5,732,242 A | * | 3/1998 | Mowry ........................ | 711/136 |
| 5,829,038 A | * | 10/1998 | Merrell et al. ............... | 711/143 |
| 6,026,470 A | * | 2/2000 | Arimilli et al. .............. | 711/128 |
| 6,189,046 B1 | * | 2/2001 | Moore et al. ................ | 709/315 |

OTHER PUBLICATIONS

IBM TDB–NB900176, Compiler and Run–Time Hints for Memory, IBM Technical Bulletin, vol. 32, Issue No. 8B, Page No. 76–77, Jan. 1, 1990.*

* cited by examiner

*Primary Examiner*—Kevin Ellis
*Assistant Examiner*—Thang Ho
(74) *Attorney, Agent, or Firm*—Scully, Scott, Murphy & Presser; Douglas W. Cameron

(57) ABSTRACT

A method and an apparatus that improves virtual memory management. The proposed method and apparatus provides an application with an efficient channel for communicating information about future behavior of an application with respect to the use of memory and other resources to the OS, a paging daemon, and other system software. The state of hint bits, which are integrated into page table entries and TLB entries and are used for communicating information to the OS, can be changed explicitly with a special instruction or implicitly as a result of referencing the associated page. The latter is useful for canceling hints. The method and apparatus enables memory allocators, garbage collectors, and compilers (such as those used by the Java platform) to use a page-aligned heap and a page-aligned stack to assist the OS in effective management of memory resources. This mechanism can also be used in other system software.

43 Claims, 17 Drawing Sheets

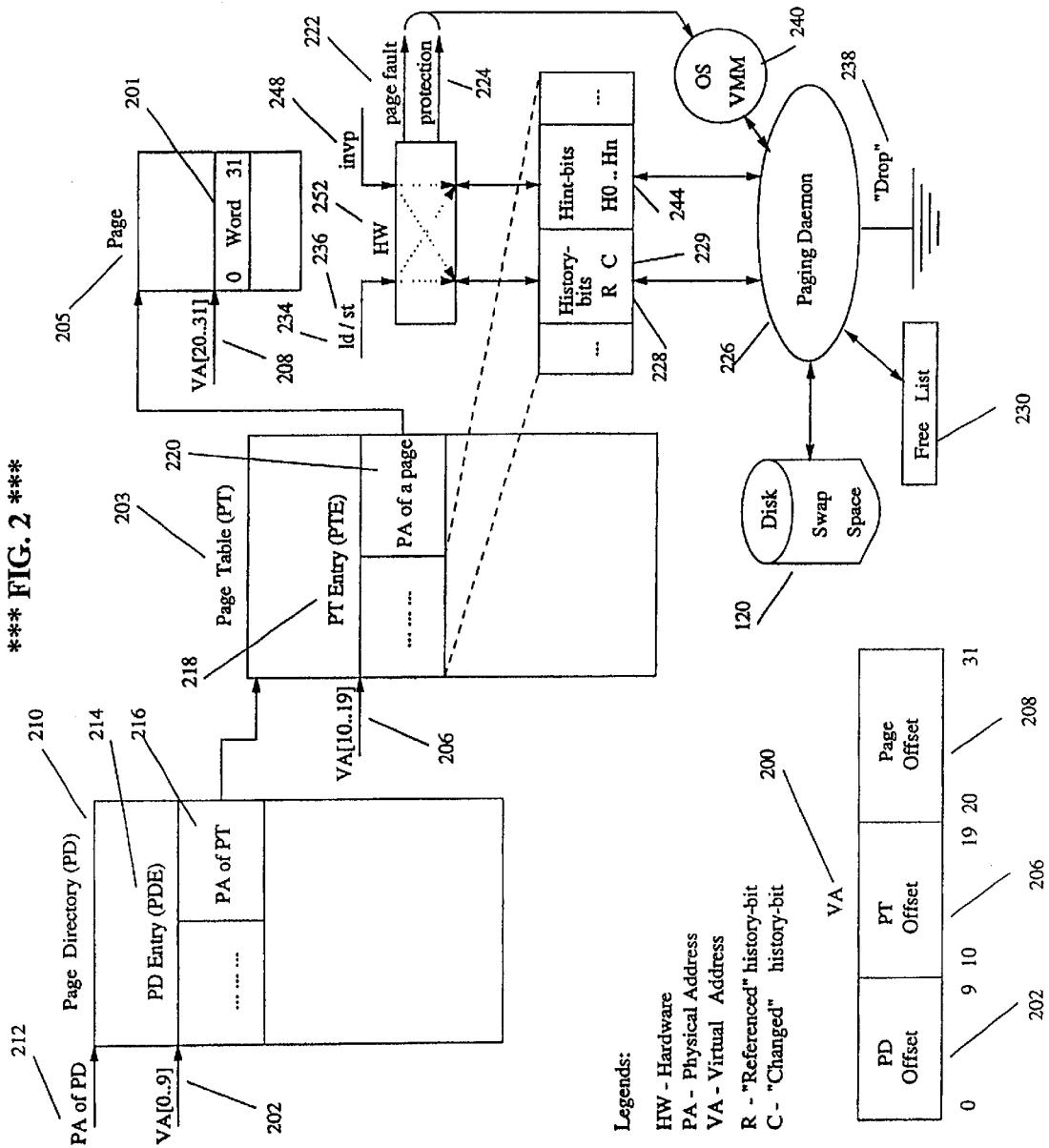

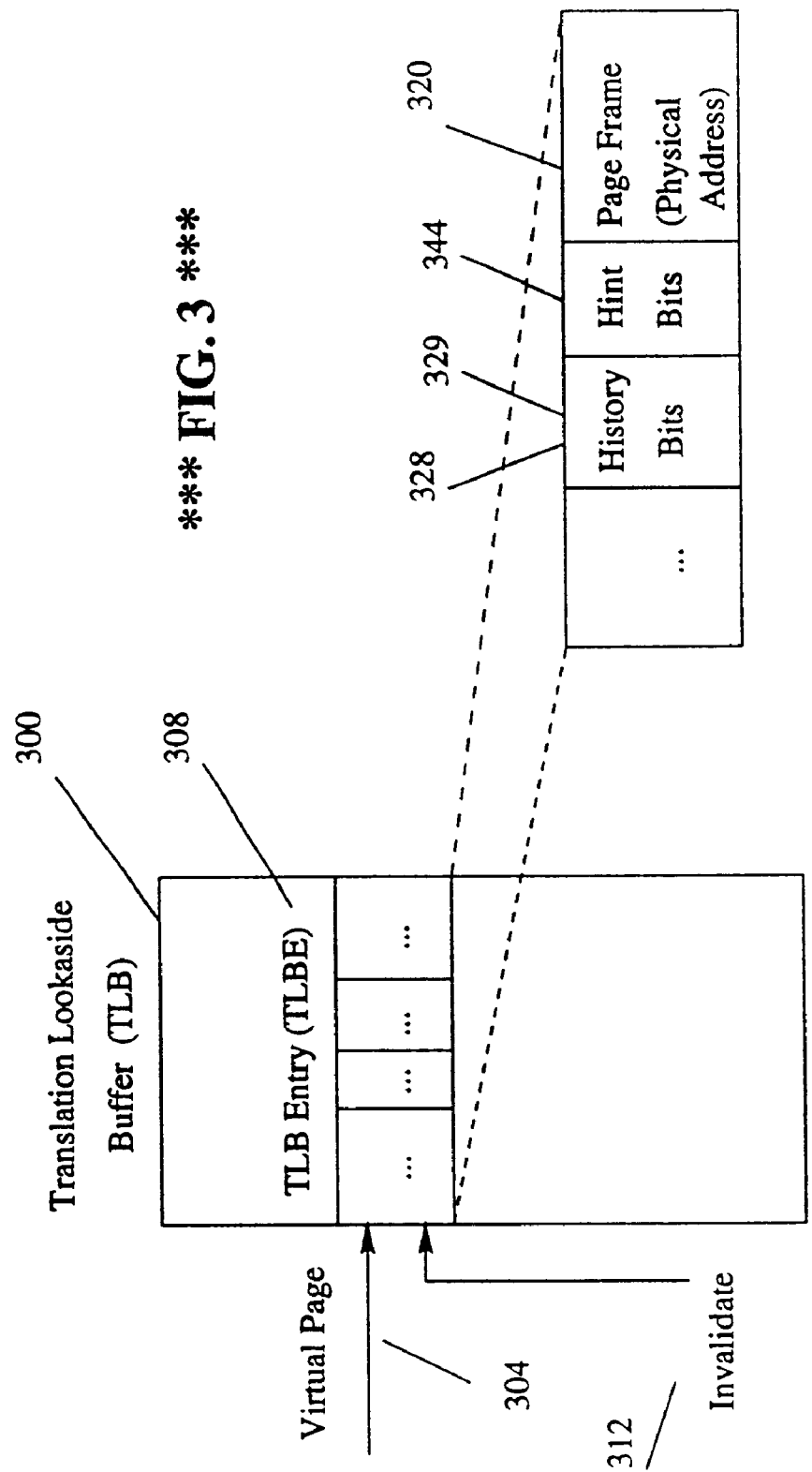

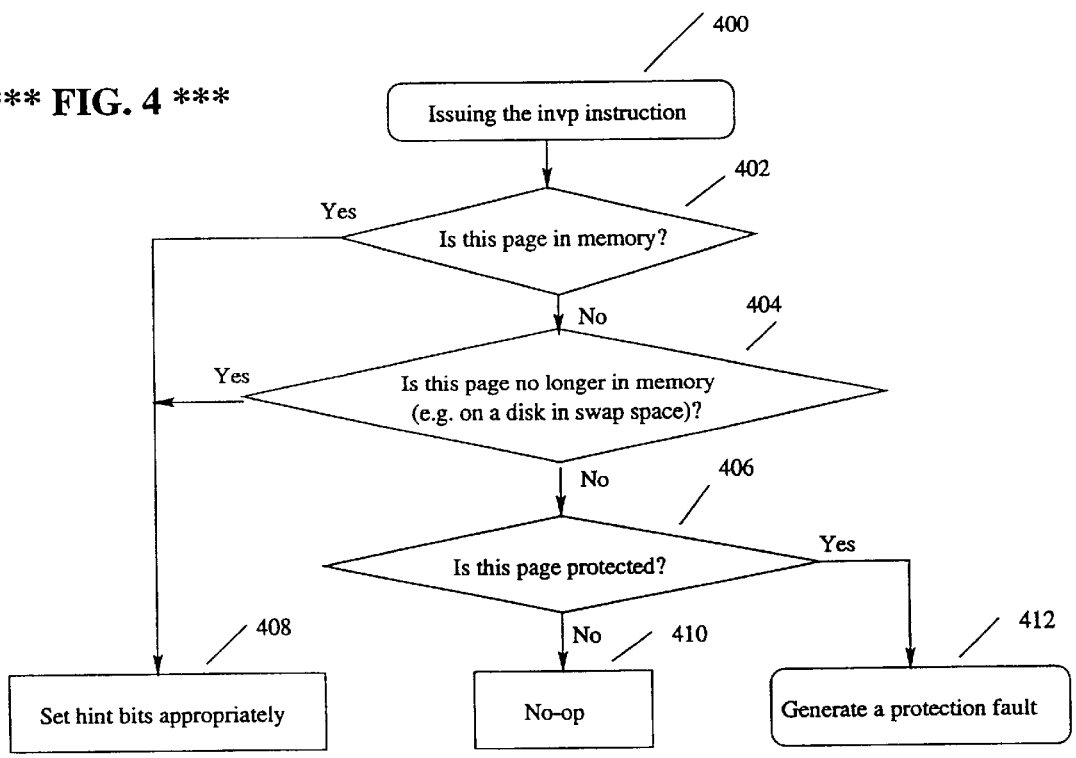

* FIG. 5 *

```
     //
500  int f(int p)
501  {
502      int large[30000]; // allocate some scratch stack data
503      int comp, t, res; // more scratch stack data
504        // stack allocated data will die when this function returns
505      if (p = 0)    // base case reached ?
506      {
507          // the bottom of the stack is reached here
508          return BASE_CASE_VALUE;
509      }
510      compute_something(large);
511      // a block (a compound statement) begins here
512      {
513          int large_temp[30000]; // more scratch stack data
514                                 // will die at the end of this block
515          comp = compute(large_temp);
516      } // end of the block
517        // use hint bits to release stack memory allocated by the block
518      t = f(p - 1);
519        // use hint bits to release stack memory allocated by function f()
520      res = t + comp + compute_more(large);
521      return res;
522  }

523  int g(int p)
524  {
525    int very_large[30000]; // some scratch stack data
526    int res;
527      // stack allocated data will die when this function returns
528    res = do_something(very_large, p);
529    return res;
530  }

531  int h(int p)
532  {
533    int res;
534    int *heap_data;
535    heap_data = malloc(4096 * 128);
536    res = process_it(p, heap_data);
537    free(heap_data);  // return to memory allocator but not released
538      // use hint bits to release heap pages here
539    return res;
540  }

541  void main(void)
542  {
543      int result1 = f(100);
544        // use hint bits to release stack memory
545        // ... an attempt to allocate memory here may cause paging
546      int result2 = g(1000);
547        // use hint bits to release stack memory
548        // ... an attempt to allocate memory here may cause paging
549      int result3 = h(200);
550        // use hint bits to release stack memory
551        // ... an attempt to allocate memory here may cause paging
552  }
```

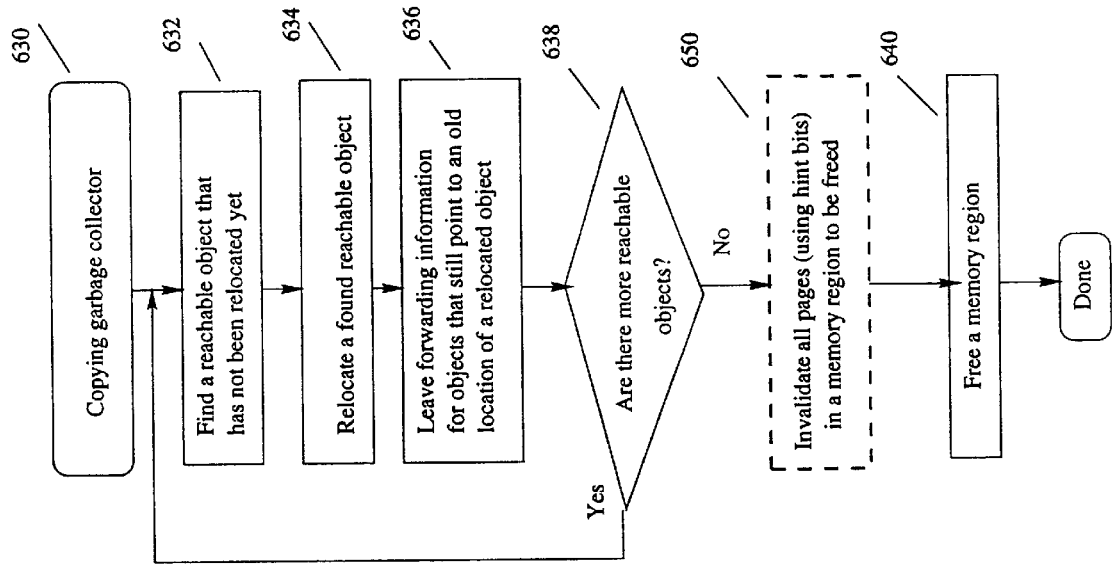
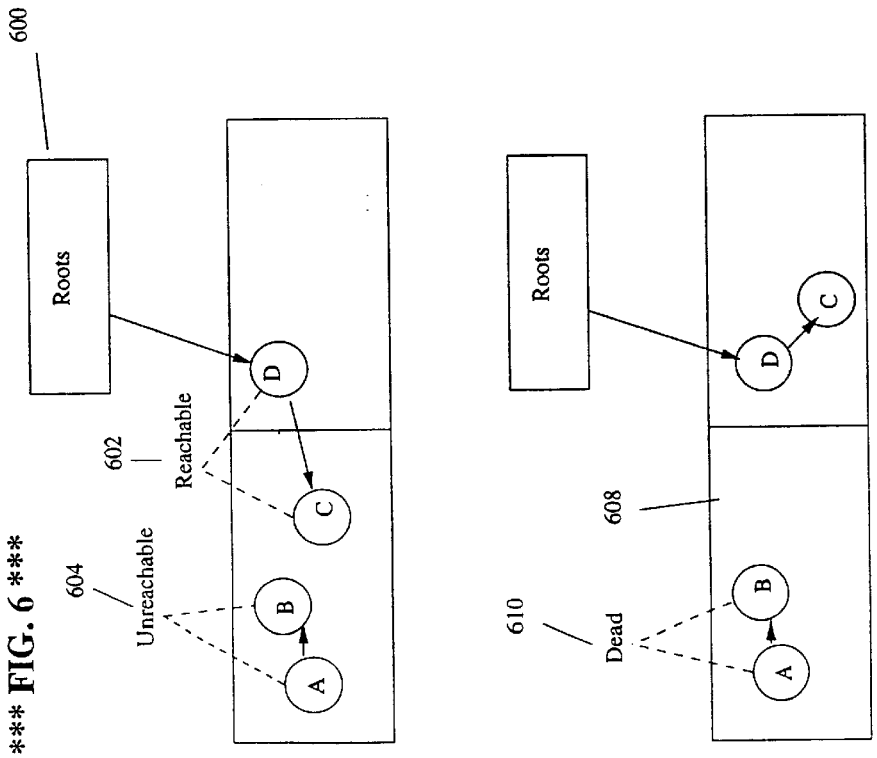
* FIG. 6 *

METHOD AND APPARATUS FOR EFFICIENT VIRTUAL MEMORY MANAGEMENT

This application claims the benefit of provisional application No. 60/198,406, filed Apr. 19, 2000.

BACKGROUND OF THE INVENTION

1. Technical Field

This invention generally relates to the management of virtual memory in a computer system. More particularly, the present invention relates to a method and an apparatus enabling an application executing in the user mode to efficiently communicate information about its future memory access behavior to the operating system.

2. Description of Prior Art

Many modern computer systems rely on some sort of virtual memory mechanism (VMM) which is controlled by the operating system (OS). A VMM is an effective way for a system to abstract away the details and the complexity of memory management, present to each process a separate virtual address space, and create an illusion of large and fast memory through the use of a hierarchy of memories of different sizes and operating at different speeds. A VMM and the OS are responsible for mapping physical pages to corresponding virtual pages (this mapping information is used by translation hardware) and processing page faults which occur as a result of accesses to virtual addresses that do not have valid translation to corresponding physical addresses.

Normally, a processor can only manipulate information (or simply data) located in the levels of memory hierarchy that are close to it (such as registers, caches, and main memory). A VMM is responsible for bringing in the data (from a disk or a network) closer to a processor (to main memory) upon request (on demand) and finding an appropriate place to store that data.

If no space is available at the level of memory hierarchy (such as main memory) where the information should be stored, some of the existing information must be evicted. A VMM and a paging daemon work together to find what information should be evicted. If the information, or simply data, to be replaced is an exact copy of that data stored elsewhere in a deeper level of memory hierarchy (such as a disk), it can be safely discarded and its space can be allocated to the data requested by a processor. On the other hand, if the data selected for replacement is a modified version of the data that was originally pulled from a deeper level of a hierarchy (such as a disk) or some new data generated by an application, then this modified or new data is copied into a deeper level of a memory hierarchy first before giving away its space.

Unfortunately, typically, a VMM is demand-driven (reactive) and because of that it suffers from a number of problems.

a) Pages that were previously saved to the external storage (such as a swap space on a disk) are brought into memory when they are referenced—on demand. Since the cost of finding the swapped out page on a disk, reading it, and bringing it to memory is high, a program will need to yield a CPU to another process and wait (for, potentially, thousands of processor cycles) without making any progress until the requested page arrives. Similarly, if a program faults while referencing a page corresponding to a memory-mapped-file, it will have to stall until the page becomes available, at which point the program can continue its execution. Hence, a system where programs often wait for a requested page to arrive is likely to have poor performance.

b) In many systems, pages are not evicted, not swapped out to a disk or freed until the number of free page frames in the free list, which holds all memory pages not currently in use, falls below a certain threshold. When that happens, a system uses various heuristics to find pages that can be freed and added to the free list. When a system is low on memory, inactive pages (such as those that were not referenced recently) are usually evicted first and then written to a disk if they are in a modified state. Unmodified pages that were originally fetched from some file do not have to be written to a disk and can be freed immediately (the contents of those pages can be refetched from that file at a later time if it becomes necessary). An access to a page that has been evicted will result in a page fault.

c) There are situations when a program generates and modifies some data which at some point in time become absolutely "useless" for that program. At this point, if a request to allocate memory comes in and little or no free space is available, some of the data may have to be written back to a disk regardless of the usefulness of that data. Indeed, when a modified page is selected for eviction, normally, it is blindly written to a disk even if a program that owns that page will never need to read the data stored on that page again. Even worse, an attempt to write to that page (which has been evicted) by a program will cause a page fault and force the system to bring in a page that has no useful content for that program. Therefore, some of the data copied back to a disk and, possibly, fetched from a disk at a later time, may be "useless" data. Such a data will occupy space on a swap disk. Writing this data to a disk and reading it later consumes valuable system resources and needlessly stalls a program.

There exist a number of solutions that allow a program to communicate to the OS various information about its future memory behavior.

Some work has been done related to the use of hints for prefetching data from disks to memory to reduce the I/O stall time. The system described in "Automatic compiler— Inserted I/O Prefetching for Out-of-Core Applications," Mowry, et al., lets a compiler (as well as a programmer) to supply "prefetch" and "release" hints for managing file I/O (in regular array-based applications).

Hint-bits are kept in a special designated communication area (DCA)—a set of shared memory pages allocated when an application is started. A bit in a "shared" page corresponds to one page (or a set of contiguous pages which may not always be convenient) in the virtual address space of an application.

This DCA may have to be pinned in memory by the OS to ensure that when the OS needs to access the DCA, the DCA is present in main memory. A large 64-bit virtual address (VA) space may require a large number of pinned pages to be allocated for such a bit-map which decreases the amount of memory available for other purposes.

(For example, if one bit is used to encode a 4k page, then one "shared" page can cover 128M ($2^{27}$) of virtual address space. Therefore, 32 ($2^{(32-27)}$) "shared" pages are neces sary to cover the entire 32-bit VA space and many more pages ($2^{(64-27)}$) are needed for a 64 bit-address space.)

$$
\begin{aligned}
\text{Addressed\_space} &= \text{page\_size} * \text{bit\_per\_page} = \\
&= \text{page\_size} * (\text{page\_size\_in\_bytes} * \text{bits\_byte}) = \\
&= 2^{12} * (2^{12} * 2^{3}) = 2^{27}
\end{aligned}
$$

An alternative solution is to have a bit-map for only a subset of pages that is of interest to an application. While it decreases the size of the DCA, it also increases the run-time overhead associated with translating virtual addresses to corresponding bits in the DCA.

The release hints, as described in "Automatic compiler—Inserted I/O Prefetching for Out-of-Core Applications," Mowry, et al., in OSDI '96, instruct the OS (by making a system call which is fairly expensive) to free unmodified (clean) pages and write out to disk all modified (dirty) pages including those pages that contain scratch data that will never be used by an application. In order to let a compiler be aggressive in generating hints and, at the same time, limit the overhead associated with making a system call to the OS, the authors of Mowry, et al. use a run-time library to filter duplicate hints. Unfortunately, not all duplicate hints can be filtered and a system call is issued for every hint that could not be eliminated by a run-time library. The hints in Mowry, et al. can only be specified for pages corresponding to memory-mapped files as opposed to arbitrary pages (such as those containing program stack and heap). There is no support in Mowry, et al. for canceling of hints.

Patterson, et al., in "Informed Prefetching and Caching," in SOSP '95, propose proactive mechanisms (informed prefetching and informed caching) to be used by I/O-intensive applications (read-intensive applications in particular) to improve file buffer management. The hints supplied by an application (through ioctl( ) system call) disclose some information about the future accesses to the file system. The hints proposed by Patterson, et al. are used by the OS for aggressive file prefetching (to reduce the I/O stalls) and intelligent cache replacement (to reduce the chance of evicting data that will be reused). Two hints are described for the following access patterns: a) for reading files sequentially from beginning to end and b) for reading a file according to an ordered list of intervals. The authors demonstrate the benefits of their mechanisms in multiprogrammed environment.

However, the system described in Patterson, et al. does not apply the hints for virtual memory management but uses them for file system resource management only. In addition, there is no support in Patterson, et al. for specifying to the OS what data will never be accessed and can be evicted and invalidated.

The importance of reducing disk I/O to improve performance in a system with demand-driven virtual memory is the main motivation for the work described in "The Case for Compressed Caching in Virtual Memory System," Wilson, et al., in USENIX Technical Conference '99. Wilson, et al. re-evaluate the idea of compressed caching for virtual memory in the context of modern systems and the current technology trends—fast processors, moderately fast memory, and slow disks. They show that the OS can substantially reduce paging and improve throughput by keeping some pages in a compressed form in main memory. In the system they propose, a part of physical memory is allocated for a compressed cache which can be thought of as an extra level of hierarchy between main memory and a disk storing (compressed) swapped out pages. Hence, the compressed cache acts as a backing store for uncompressed regions of memory.

The system proposed in Wilson, et al. demonstrates the benefit of reducing disk I/O. In fact, the real benefit is likely to be even higher than that reported in Wilson, et al. because the authors chose not to compress pages containing executable code.

Their system is reactive—it passively observes the behavior of an application and makes some predictions about its future behavior based exclusively on the past behavior. The system in Wilson, et al. does not have any support for an application to point out to the OS what pages (such as those containing useless data) do not have to be backed up. As a result, more pages than necessary will have to be compressed and more compressed pages will have to be written back to a disk. The former will increase cache pollution and increase the amount of data copied by a compression procedure, while the latter will increase the amount of data transferred between memory and external storage.

U.S. Pat. No. 5,559,978 to Spilo describes a system resembling closely the one discussed in Wilson, et al. Similarly, there is no support for supplying hints to a secondary virtual memory control program to instruct it to place a page directly on the free list and bypass the compression phase.

U.S. Pat. No. 5,544,349 to Berry et al. describes a system where some memory pages are compressed to increase the amount of code and data that can be present in main memory and to reduce paging activity. The system proposed by Berry, et al. does not have any support for communicating hints to the OS and does not take into account the fact that some pages do not have to be compressed.

Although the DIAGNOSE X'214' operation (available on S/390 servers) can be used to cancel a pending page release, a separate explicit request must be issued directly to the OS. DIAGNOSE X'214' (which resembles a software interrupt) is a relatively expensive call, and it costs at least a few hundred of instructions to invoke it. In fact, the cost of making a call to DIAGNOSE X'214' is close to the cost of processing a page fault (~600 instructions). Also, DIAGNOSE X'214' can only be used in the supervisor (privileged) mode. Finally, DIAGNOSE X'214' is normally used by the OS itself to release large chunks of memory when a process terminates.

There are several subroutines in AIX *operating systems (as well as in a number of other UNIX*-like OSs) that allow an application to communicate some information about its memory requirements to the OS. (UNIX is a trademark of UNIX System Laboratories, Inc. AIX is a trademark of International Business Machines, Inc.) Specifically, an application can indicate that it no longer needs as much memory as it currently has.

Subroutine shmctl( ), which controls shared-memory operations, can reduce the size of a shared-memory segment but only from the end.

Similarly, truncate( ) and ftruncate( ) can change the length of a regular file.

Subroutines brk( ) and sbrk( ) can be used to control the amount of space allocated for the data segment of the calling process.

Again, the size of the data segment can only be adjusted from the end.

msync( ) subroutine, transfers (MS_SYNC and MS_ASYNC) modified pages of mapped file regions to a disk. It can also invalidate (MS_INVALIDATE) all cached copies of the pages that belong to a mapped file. However, pages occupied by program's stack, heap, and static data cannot be mapped to a file. Hence, msync( ) cannot be used to specify that certain modified pages containing stack or heap data should be discarded.

madvise( ) subroutine can be used by an application to advise the OS of expected paging behavior. One of its options, MADV_DONTNEED, is used to instruct the OS that certain pages (corresponding to a mapped file region) will not be needed.

The instruction sets of several modern microprocessors include a number of instructions for managing on-chip instruction and data caches as well as instruction and data translation look-aside buffers (TLBs). TLBs are used to speed up the translation of virtual memory addresses to physical memory addresses. Among other things, TLBs keep the translation information for a few recently accessed pages.

Some of the instructions for managing caches and TLBs are privileged (such as those that invalidate entries in data caches and TLBs) and, due to their destructive effect, are available to the supervisor-mode (privileged) processes only, while others (such as hints for prefetching a cache line), can be used by user-level processes.

Some cache management instructions are used by the OS to ensure that the DMA (Direct Memory Access) transfers are performed correctly. Usually, a DMA controller cannot fetch the data from a processor cache or place the data directly into the cache. Hence, the data must be flushed (copied) from the cache to system memory and the cache lines must be invalidated before performing a DMA transfer. In addition, the contents of the DMA buffer must be flushed (copied) to memory once the transfer is complete. These steps are necessary to ensure that the main memory always contains the most recent data (as well as the only copy of the data) immediately before and after a DMA transfer.

In processors that have separate instruction and data caches, modifications done to a cache block in the data cache are not usually propagated directly to the instruction cache. In this case, the data must be flushed from the data cache to memory. Then, the corresponding instruction cache blocks and the instruction prefetch buffer must be invalidated.

Translation look-aside buffers (TLBs) are not usually kept coherent with respect to page tables stored in main memory. Therefore, in any uniprocessor as well as a multiprocessor system, once a page table entry is modified, a corresponding TLB entry (or an entire TLB) must be invalidated (with a special privileged instruction) to ensure correctness by forcing a subsequent reload of a TLB entry as a result of a TLB miss.

Therefore, what is needed is a communication channel that will allow user-level programs to specify to the OS what pages it will and will not be referencing soon; the degree of importance for a given page to be in memory; the content of what pages can be safely discarded. (invalidated), and how should invalidated pages be initialized on a page fault. (Those skilled in the art will understand that other useful information may be exchanged between a program and the OS.) A page can be any arbitrary page including those containing program stack and data.

It is important that this communication channel be very efficient so that it can be used aggressively when it is necessary. Therefore, this channel should avoid using system calls as a way to communicate hints to the OS.

It is desirable to have advisory (non-binding) hints. The OS must be able to simply ignore the advisory hints (for example, when enough memory is available). If the OS chooses to disregard program-supplied hints, the overhead and the loss of performance should be minimal. A program should be able to batch the hints and the OS should not have to act upon the information in the hints immediately. If possible, the OS should not be involved in processing the advisory hints until, possibly, a context switch or a page fault.

A program should have an opportunity to "change" its mind and "cancel" certain hints for a page for which it is still an owner. Canceling those hints should not require making an explicit call to the OS. It should be inexpensive and transparent for both an application and the OS. The communication channel should scale to large address spaces.

The prior art has no references to a communication channel with the characteristics listed above.

Since none of the communication channels described in the prior art have the desired characteristics, new methods for exchanging a variety of application specific information with the OS are needed for efficient management of virtual memory.

SUMMARY OF THE INVENTION

It is an object of this invention to reduce the number of data transfers and the amount of data transferred between main memory and a disk, and to avoid transfers of "useless" data.

It is an object of this invention to make canceling the hints implicit, inexpensive, and transparent for both an application and the OS.

It is an object of this invention to facilitate a timely release of memory resources not essential for maintaining a desired level of performance and to enable allocation of these memory resources among programs sharing a system.

It is an object of this invention to reduce the number of page faults and the time spent on handling them and initializing new pages.

It is an object of this invention to avoid unnecessary paging activity in a memory system and to facilitate effective allocation of memory resources among multiple applications.

It is another more specific object of this invention to reduce page faults.

It is another more specific object of this invention to reduce the amount of time the program has to wait for an I/O (input/output) operation to be completed.

It is another more specific object of this invention to avoid transfers of useless data, especially between memory and disk.

It is another more specific object of this invention to avoid the referencing of a page after it has been swapped out of main memory to disk.

Another object of this invention is to provide a user-level application with a method and an apparatus for implementing an efficient channel for communicating hints to the OS. An application can use this channel to inform the OS about the use of memory resources allocated to the application in the future and its expected paging behavior. The communication channel, i.e. hint bits, overlaps with page tables and does not require a separate designated communication area (DCA).

Through these hints, an application can specify what pages it will and will not be referencing soon; the degree of importance for a given page to be in memory; the contents of what pages can be safely discarded (invalidated) and how should the invalidated pages be initialized on a page fault.

The content of a page marked for invalidation does not need to be written back to a disk when such a page is evicted (even if this page is in a modified/dirty state).

In an alternate embodiment other hint bits may be added and other useful information may be encoded in hint bits. Some semantic meaning is associated with the state of a single hint bit or a group of hint bits. The state of hint bits is inspected and interpreted by the OS and other system software (e.g. a paging daemon).

In a alternative embodiment, the hints are advisory and the OS can simply ignore the hints (for example, when enough memory is available). A program can batch the hints, and the OS does not have to act upon the information in the hints immediately. The OS does not need to be involved in processing the hints until, possibly, a context switch or a page fault.

In an alternate embodiment, mandatory hints are implemented. The OS may not ignore such hints but can delay the processing of these hints.

In yet another embodiment, another class of mandatory hints are implemented. These hints cannot be ignored by the OS and require an immediate attention from the OS.

The communication channel is integrated into the VMM. The communication is enabled with a special user-level instruction, which is another aspect of this invention, used to manipulate the state of hint bits. The hint bits are integrated into the page table entries and translation look-aside buffer (TLB) entries which is another aspect of this invention. Unused "reserved" bits in a page table entry (PTE) and a translation look-aside buffer entry (TLBE) can be used for hint bits. In an alternate embodiment PTEs and TLBEs can be made bigger to make space for hint bits. One (or more than one) user-level instruction which controls a hint bit or a group of hint bits is added to the Instruction Set Architecture (ISA) of a processor.

Another aspect of the present invention is an apparatus coupled with load and store instructions.

The apparatus allows an application to cancel a request (contained in hint bits.) to invalidate a page. Canceling a request can be done implicitly—simply by referencing a page for which an application previously issued an invalidation request (as an alternative to making an explicit call to the OS). In an alternate embodiment canceling can be done explicitly by using a special instruction which clears an appropriate hint bit. Namely, if an application invalidates (releases) a page and subsequently stores something to that page, a hint bit will be cleared, and the OS will not take that page from an application so long as the page still belongs to an application. Similarly, if an application releases a page and then reads from that page, hardware will throw an exception (to prevent programs from reading meaningless data and to catch dangling pointers). In an alternate embodiment other semantics may be assigned to the load and store instructions if it is necessary (e.g. no page faults on a load).

If a page has been taken from an application and the application attempts to reference the page, a page fault will occur and a method for handling page faults will be invoked. The page fault handling method may choose to examine the hint bits for the page in question to determine what method should be used to initialize a newly allocated page frame. The method for initializing a page may be a method filling a page with zeroes. The same method can also be a method not performing any initializations so long as doing so does not pose a security threat (e.g. if the process for which a page is being allocated was the previous owner of that page and from which this page was stolen).

The invention teaches how a method and apparatus of the present invention can be used in compilers to manage stack data, and garbage collectors and memory allocators to manage heap data. Namely, it is shown how stack and heap pages containing useless data can be invalidated.

An application programmer can use this invention to reduce paging activity, improve system performance and the utilization of memory resources by indicating the following:

(a) which memory pages (among those currently assigned to that application) may be taken away and deallocated, because the application does not intend to access them in the near future, (b) what memory pages will never be accessed by an application, (c) what pages containing scratch data do not have to be saved in the next level of memory hierarchy (such as a disk) should the space occupied by the scratch data be reallocated for some other purposes, (d) which memory pages will not be accessed frequently and whose constant presence in memory is not essential for achieving some specified level of quality of service (QoS), (e) which memory pages are essential, in the order of importance, for meeting certain quality of service (QoS) requirements and should remain in memory regardless of the history and the pattern of accesses to them.

BRIEF DESCRIPTION OF THE DRAWINGS

FIG. 2 is a block diagram showing how the present invention extends and interacts with VMM hardware and system software.

FIG. 3 is a block diagram showing a translation look-aside buffer (TLB) augmented with hint bits defined in the present invention.

FIG. 4 is a block diagram showing the logic of an instruction used to set hint bits defined in the present invention.

FIG. 5 is a pseudo-code of a sample program using stack and heap for temporary data and a number of comments discussing potential performance problems and ways to address them using a method of the present invention.

FIG. 6 is a block diagram showing the use of a method of the present invention with a copying garbage collector.

DETAILED DESCRIPTION OF THE INVENTION

Figure 1:
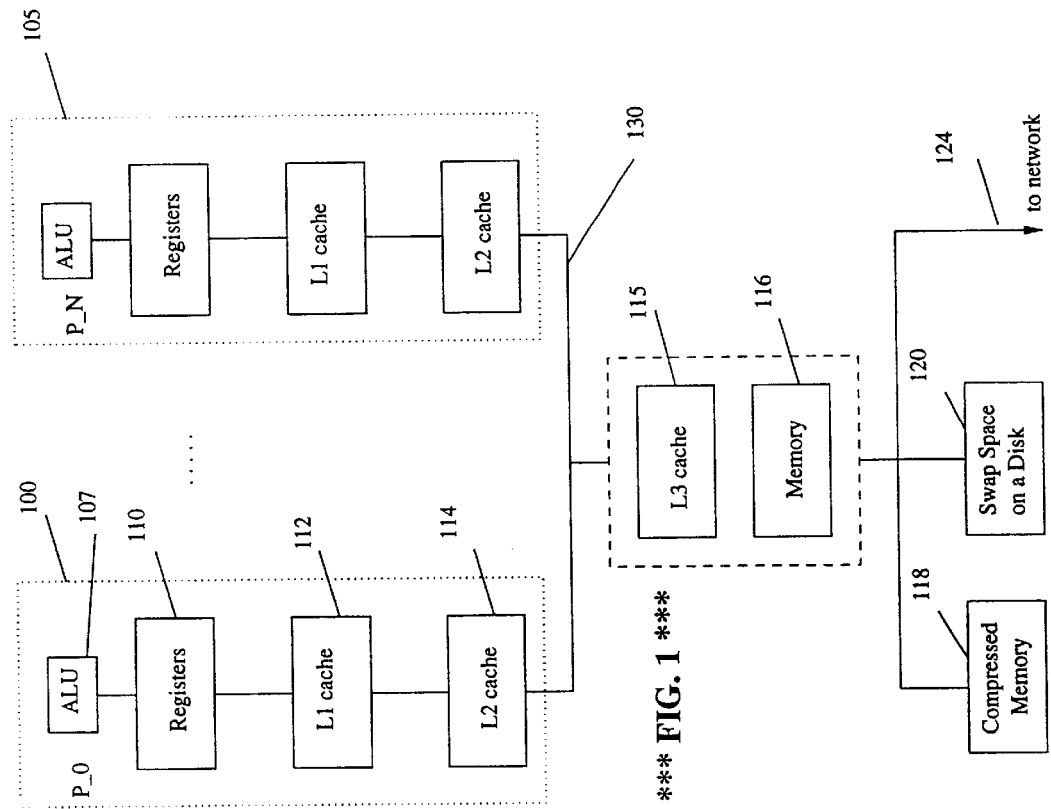
FIG. 1 is a block diagram of a memory hierarchy in a typical computer system on which a preferred embodiment of the present invention operates.

FIG. 1 is a block diagram showing a memory hierarchy in a typical computer system built of a number of processors P_0 ... P_N (100 ... 105). In addition to an ALU (107) performing computations, a processor may have a small number of fast registers (110) for keeping temporary data. One (112) or more (114) levels of relatively small caches may be implemented. Caches are used to keep some recently and frequently referenced data. L1 caches constitute the lowest level of memory hierarchy. L2 caches are at the higher level of memory hierarchy. (L3 caches (115) can also be implemented.) Caches of different processors are connected by a bus (130) that is also connected to relatively large L3 cache (115) and/or main memory (116). To create an appearance of large main memory, the OS may choose to keep some memory compressed (118), move some data to swap space on a disk (120), or send it across a network (124) to another system (like the one depicted in FIG. 1) where the data is stored. Those skilled in the art will be familiar with many other equivalent computer systems on which the present invention can be implemented.

FIG. 2 is a block diagram showing how the present invention extends the existing VMM hardware and system software and how it interacts with them. Let us consider a generic VMM architecture and assume, without loss of generality, that a granularity of memory accesses is one word (32 bits)(201) and that a 32-bit virtual address (200) can be broken down into 3 parts. (Without loss of generality, we will consider here a page based translation scheme with a two level page table.) Suppose, the first 10 bits correspond to an offset (202) in a page directory (201) (PD Offset); the next 10 bits correspond to an offset (206) in a page table (203) (PT Offset); and, finally, the last 12 bits give us an offset (208) in a page (205)(assuming a 4k page).

Those skilled in the art will be familiar with other schemes for translating virtual addresses to physical addresses (i.e. other than a paged based scheme described here) and will know how to customize a translation scheme for a particular environment (e.g. an environment where a virtual address has 64 bits and/or a page size is 8k, with a single or three level page table, or with no page tables).

Normally, the OS creates a PD (210) and the physical address (PA) of a PD (PA of PD) (212) is placed into some hardware register.

When a program issues a load or a store, the VMM hardware must first translate virtual addresses (VAs) visible to a program into physical addresses (PAs) that hardware can understand.

In the simplest case, the PA of PD (212) is used along with the PD Offset (202) to locate an entry (214) in a PD (210) (PDE). Among a number of fields, a PD Entry (214) contains the PA of a page table (PA of PT) (216). Then, the PA of PT (216) is used along with the PT Offset (206) to locate an entry (218) in a PT (PTE). Among a number of fields, a PT Entry contains the PA of a page (220). Finally, the PA of a page (220) is used along with a Page Offset (208) to locate a word (201) in memory to be read or written to.

It may happen that a PT (203), does not have information about a page that an application attempts to access. In this case, a page fault (222) is generated. The VMM software will attempt to load a corresponding entry in a PT if the page in question is in memory (116). If the page is in a swap space (120) (which contains the pages that can't fit into physical memory), it is first brought into memory (116) and then the PTE is filled. If a referenced page has never been accessed before, it is initialized (for example, with all zeros) and the corresponding entry in a PT is created.

Should a program reference a memory location outside of its territory, a protection fault (224) is generated and an appropriate handler is invoked.

Every time a word in memory is referenced, some information in the corresponding PTE (such as history bits) (228 ... 229) may have to be updated. This information is later used by the paging daemon (226) when the system is low on memory, i.e. when the free list of pages (230) contains fewer pages than some specified threshold.

Specifically, PTEs tend to have 2 history bits: the "Referenced" bit (228) and the "Changed" bit (229) If a memory page has not been touched, both history bits are set to zero. A load instruction (234) will set the Referenced bit and a store instruction (236) will set both of these bits.

(Some systems do not have history bits implemented in hardware. On such systems, the system software can simulate history bits to keep track of referenced and modified pages.)

When virtual memory requirements exceed the physical memory available in a system, the OS uses paging techniques to move memory into deeper levels of memory hierarchy, i.e. swap space on a disk.

Namely, when the free list gets too short, the paging daemon examines these history bits to find pages that can be evicted. A well-known two-hand clock algorithm is commonly used to find pages that were not referenced recently. Such pages are less likely to be referenced soon and, therefore, are good candidates for eviction. Some pages are written to the swap space before they are evicted.

Generally, a page that is unmodified and still available in the file system can be simply discarded ("dropped") (238)—it is not copied to the swap space. The content of such a page can be refetched on the next reference to it. Examples are pages corresponding to executables and memory mapped files.

On the other hand, pages that are in a modified state (such as process data, stack, and heap) are copied from main memory (116) to secondary memory, i.e. swap space (120), and reloaded at subsequent reference.

Referring to FIG. 3, modern processors may implement one or more translation look-aside buffers (TLBs) (300). A TLB caches translation information (from PTEs (218)) for some most recently used pages. For example, a VA may be broken down into a virtual page number (304) (which may be a combination of PD offset (202) and a PT offset (206)) and a page offset (208). A virtual page number (304) is used to do a lookup in a TLB (300). If a TLB entry (TLBE) (308) corresponding to a page in question is found in a TLB, a look up in a PD (210) and a PT (203) can be avoided.

Usually, processors do not keep TLBs (300) coherent with respect to PTs (203) stored in memory. Therefore, when any part of a PTE (218) is updated, a corresponding TLBE. (308) has to be invalidated using a special instruction which raises an invalidate signal (312).

In the following, we describe how the present invention improves previously discussed systems and architectures.

In accordance with the present invention, several hint-bits (244) are added to a PTE (218). Similarly, hints-bits (344) are added to every TLBE (308). In many processors, the unused "reserved" PTE bits and TLBE bits are used for hint-bits. In that case, the size of a PTE and TLBE remains the same. In an alternate embodiment, a PTE and TLBE are enlarged as necessary to make space for hint bits.

These hint-bits are manipulated directly (from user-level software) using a special user-level assembly instruction (248) (shown as invp in FIG. 2 and described in detail below). In an alternate embodiment, several such user-level instructions exist such that each instruction is used to manipulate one hint bit or a certain group of hint-bits.

A semantic meaning is associated with a single bit or with a group of bits. The semantic meaning is interpreted by a paging daemon and other system software.

The software executing in the privileged mode can also use such a user-level instruction. In addition, the software executing in privileged mode can examine the state of hint bits with a load instruction and change the state of hint bits with a store instruction (i.e. by modifying a PTE directly).

An application communicates various information about its paging behavior (such as mark pages that can be invalidated or evicted or both) to the paging daemon (and possibly other system software) by setting the hint-bits as appropriate. The paging daemon and other system software can inspect the hint bits (244) in a PTE (218) (using a load instruction (234)) when it needs to find some pages that can be freed and added to a free list (230). A page marked for invalidation will not be written back to the next level of memory hierarchy or an external storage device (e.g. a disk) when such a page is evicted, even if that page is in a modified state. (The content of a page marked as invalid is useless.) The hint can carry a variety of information, the system software processes that information appropriately. For example, in an embodiment where a prefetch and a release hint bits are implemented, the system software can examine the state of such bits and attempt to prefetch or release a page as appropriate. In an alternate embodiment a number of hint bits that let an application specify the degree of importance (a priority) of a page are implemented. The system software can examine such bits to decide what pages should be evicted first and what pages should remain in memory.

Another aspect of the present invention is the use of a method and an apparatus by a data manager for managing data (e.g. stack and heap) pages in a compiler, a garbage collector, and a memory allocator.

Figure 14:
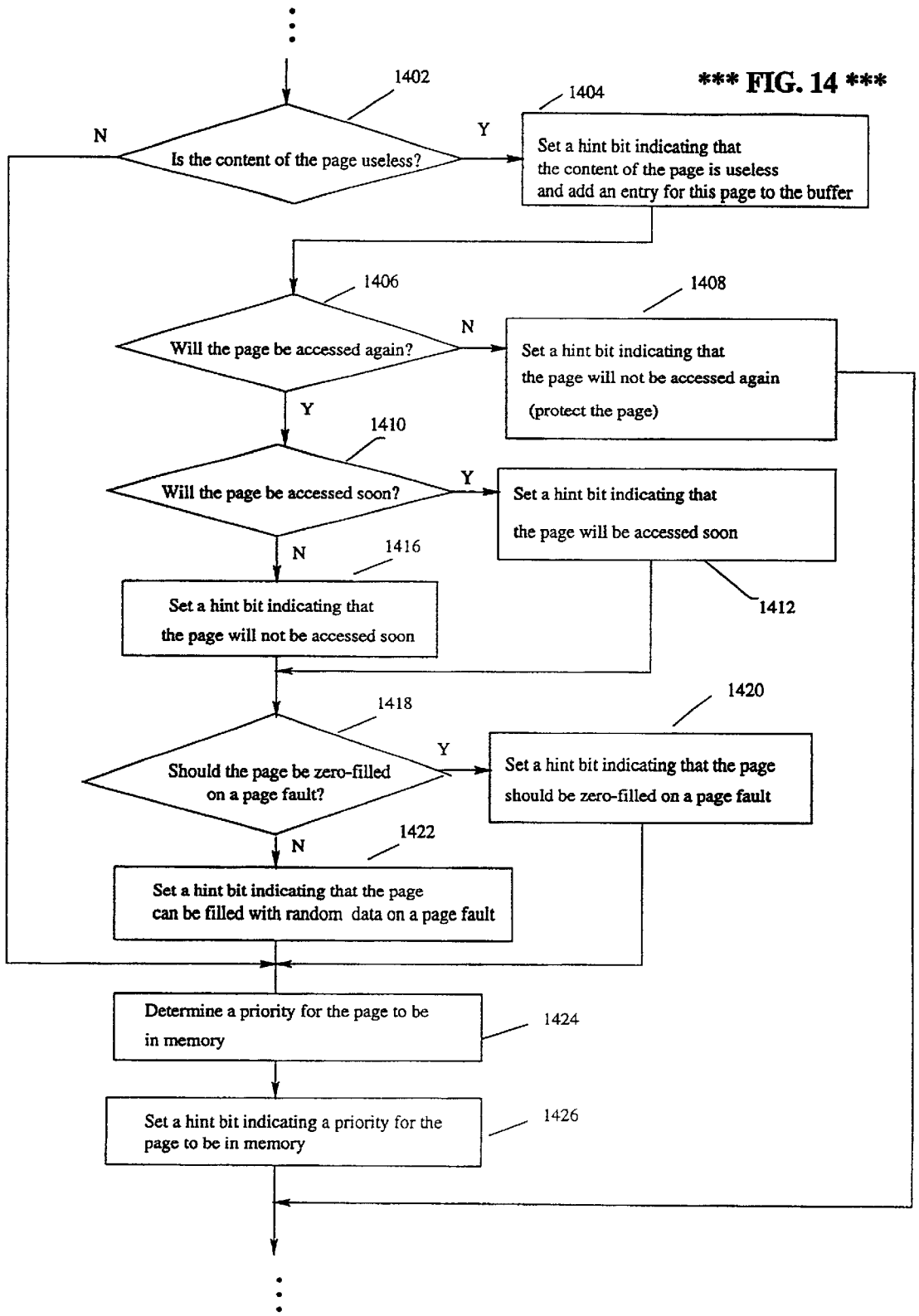
FIG. 14 is a flow chart showing some of the conditions under which hint bits are set.

FIG. 14 shows some of the conditions under which hint bits are set by the data manager. For example, when the content of some memory region used by a program becomes useless, the hint bits are set appropriately to communicate this information to the system (e.g. hint bits can be set using the invp instruction which causes an entry with a page ID to be added to the buffer (800) (described in detail below). The data manager uses the knowledge of the future memory access pattern of a program to set hint bits appropriately.

For example, as shown in FIG. 14, if the data manager determines that the content of some page is useless (1402), it sets the appropriate hint bit to indicate (1404) that the data in that page does not have to be written back to a disk. In addition, an entry for a page whose content is indicated to be useless is added to the buffer (800) in (1404). (The details on how to determine whether a page contains useless data can be found below and are depicted in 638, 745, 1046, 1048, and 1154.) If a page will not be accessed again (1406), the data manager can set (1408) a hint bit to specify this piece of information and protect the page (a protection fault will be generated if this page is accessed again). The data manager can determine whether a page is likely to be accessed soon (1410) and set a hint bit appropriately in (1412) or (1416). The data manager can determine whether it needs a zero-filled page on a page fault (1418) and specify that information for the OS in (1420) and (1422). The data manager can determine the degree of importance for the page to be in memory (1424) and specify (1426) that information for the OS. The details on how to determine whether a page will not be accessed again, whether a page is likely to be accessed soon, whether a page needs to be zero-filled on a page fault, and how to determine the priority of a page can be found in the prior art.

A programmer can play a role of a data manager, analyze a program, and (manually) insert code for manipulating hint bits in appropriate places in a program.

Referring to FIG. 4, when using an instruction that controls hint bits (e.g. the invp instruction) (400), several situations are possible. What follows is the list of those situations and a possible behavior. Those skilled in the art will recognize that some other behavior may be desirable on different systems.

If the invp instruction is applied to a page in memory (402), the hint bits are set appropriately (408) (to prevent that page from being swapped out even in the presence of memory pressure).

If the invp instruction is applied to a page that is no longer in memory (404) (e.g. a page is currently residing on a disk in swap space or, more generally, in the next level of memory hierarchy), the hint bits are set appropriately (408) (e.g. to prevent that page from being re-fetched from swap space on the next access to that page).

If the invp instruction is applied to a page that a program is not allowed to reference (406), a protection fault is generated (412).

If the invp instruction is applied to a page that has never been referenced, the instruction is treated as a no-op (410).

Referring to FIG. 2, in accordance with another aspect of the present invention, we introduce hardware (252) that will undo the effect of invp instruction (248) should an application access (e.g. issue a load or a store) the page in question (i.e. for which hint bits were set) again (assuming that the page has not been taken away from an application). The hardware (252) checks the state of an appropriate invalidation hint bit for load and store instruction. (In a complex instruction set computing (CISC) processor where complex instructions can reference memory, the hardware would check each such instruction.)

Namely, if a program stores to a page which it requested to be invalidated, a hint bit requesting that page to be invalidated is cleared (implicitly) by hardware (252). Such a page will not be invalidated unless a program marks that page for invalidation again.

Similarly, if a program loads from a page which it requested to be invalidated, hardware generates a page fault. In an alternate embodiment, hardware may be programmed to simply clear an appropriate hint bit and proceed with execution without causing a page fault.

In another embodiment a special instruction may be implemented. Such an instruction allows a program to clear hint bits explicitly.

In accordance with another aspect of the present invention, we introduce hardware (252) that would, subsequent to a page being invalidated, cause a page fault (222) on the next access to the page in question even if the page is in memory and is mapped into the address space of an application.

In accordance with another aspect of the present invention, we introduce hardware (252), which will cause a page fault (222) should an application access a page that has been taken away from an application, and a hardware hint bit (244), which will communicate information about how the OS may initialize a page frame before it is given to an application.

In accordance with another aspect of the present invention, we provide a mechanism (preferably in hardware) (252) that will cause a protection fault (224) should an application access a page that it has said would never be accessed, in the future. An application indicates what page it will never access by setting an appropriate hint bit.

Figure 16:
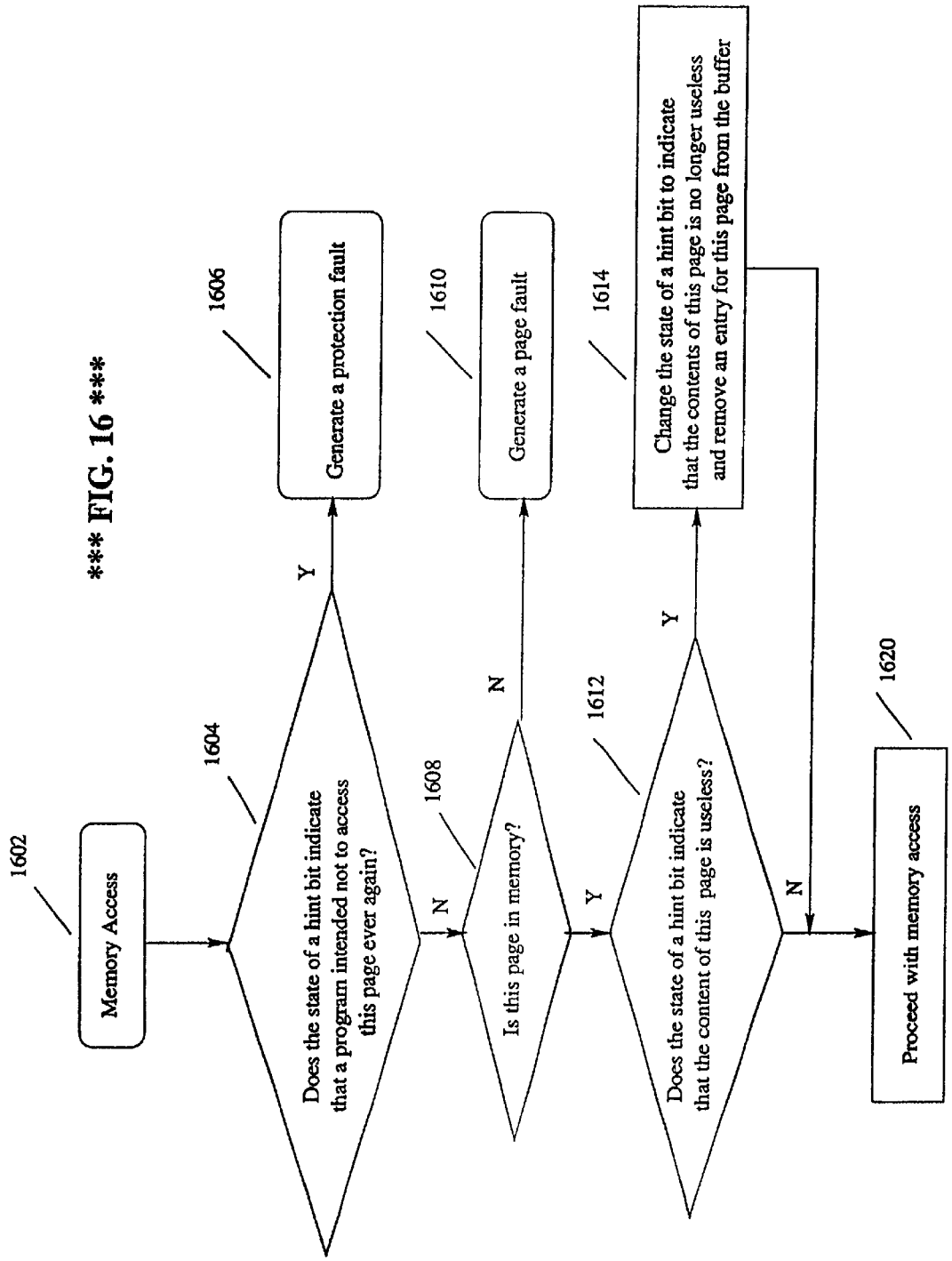
FIG. 16 is a flow chart showing what checks are performed by hardware when some memory location is referenced.

The hint bits are examined on each memory access. FIG. 16 shows what checks are performed by hardware when some memory location is referenced. When a page is accessed (1602), an appropriate hint bit is checked to see whether a program indicated that the corresponding page would never be accessed (1604). If that is the case, a protection fault is generated by hardware (1606). Otherwise, it is checked whether the page to be accessed is in memory (1608). If the page is not in memory, a page fault is generated by hardware (1610). Otherwise, it is checked whether a hint bit indicates that the page contains useless data (1612). If that is the case, in step (1614) the state of such a bit is changed to indicate that the content of the page is no longer useless and a corresponding entry is removed from the buffer (800). Otherwise, a memory location is accessed as usual (1620).

Note that some hints do not change page protection. (those hints can be safely ignored, e.g. advisory hints), while others do (these hints cannot be ignored, e.g. mandatory hints). If the state of a hint-bit that affects page protection is changed in a PTE, the corresponding TLB entry must be invalidated (because processors do not usually keep TLBs coherent with respect to PTEs). In that case, in a system where a user-level TLB Invalidate Entry instruction is available, it is issued immediately after the Invalidate Page (invp) instruction. In a system, where such an instruction is not available to user-level processes, the invp instruction will need to invalidate the corresponding TLB entry. Alternatively, this role is delegated to system software.

A global TLB Invalidate Entry instruction (the one that broadcasts this operation to all processors on the same bus) is used if it is available. If a global TLB Invalidate Entry is not available or where such an instruction can only be issued by one processor at a time, system software will be used to invalidate TLB entries and to ensure that all the necessary conditions are met. This can be accomplished by generating a cross-processor interrupt as part of the invp instruction and a software TLB protocol, also known as TLB shootdown.

Those skilled in the art will know what coherence issues are on other systems, how to invalidate TLB entries on those systems, and whether it is necessary to invalidate a TLBE in question there (e.g. on a system that implements a coherent TLB or has no TLBs at all).

Figure 8:
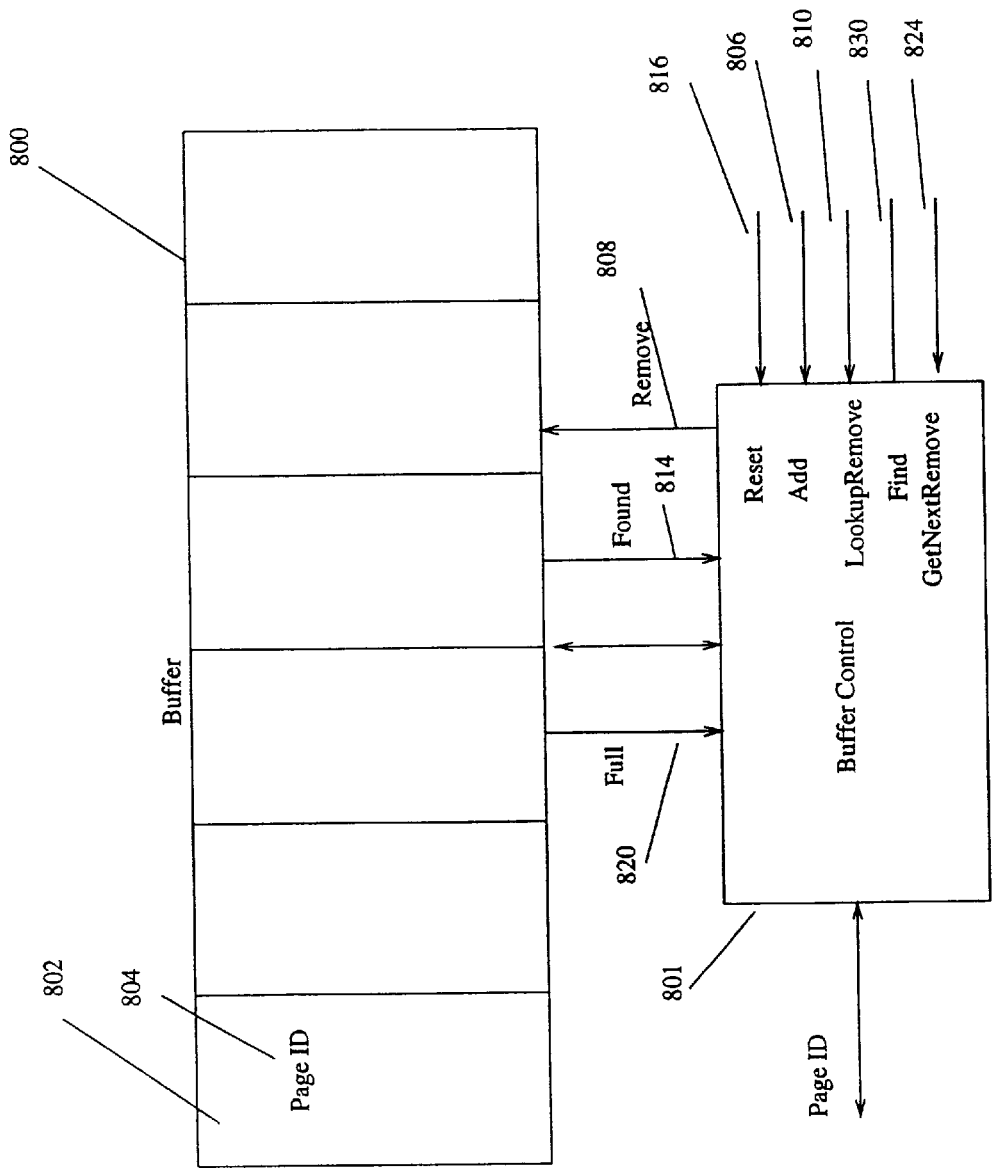
FIG. 8 is a block diagram showing a buffer, whose entries contain the identities of some number of pages for which certain hint bits were set, and a device controlling the buffer.

Referring to FIG. 8, another aspect of the present invention is a buffer (800) (preferably in hardware) having a number of entries and a buffer control (801). Each entry (802) in the buffer can contain an identity of a page (804) (e.g. a physical page number and/or virtual page number) for which certain hint bit is set (e.g. using invp instruction). An example of such a hint bit is a bit indicating that a page should be invalidated. (In another embodiment a buffer entry can also contain hint bits.) When such an invalidate hint bit is set, (e.g. using the invp instruction) an entry containing the identity of the corresponding page is added (806) to the buffer. If all entries are full (820) (if no entry is available), one of the entries is removed (808) according to some policy (such as "first in, first out" or some other). In another embodiment, no entries are added once the buffer is full.

The buffer lookup is performed (810) on every reference. When a page whose identity is found (814) in a buffer is referenced again using a load or a store instruction, the corresponding entry is removed and made available.

All entries in the buffer can be cleared (816) when necessary.

The entries in the buffer are inspected (824) by a paging daemon and other system software (e.g. to find thee identity of a page that should be invalidated/released), then page tables are inspected and hints are processed accordingly. (The buffer (800) allows a paging daemon to easily find a page that can be evicted instead of scanning through a page table.) in one embodiment the buffer is memory mapped and is controlled with load and store instructions by a system software executing in privileged mode. In another embodiment the buffer is controlled by manipulating the content of some special purpose registers.

In an alternate embodiment, other control signals are added to the buffer (800). In an alternate embodiment, more than one instance of the buffer (800) can be implemented.

Figure 12:
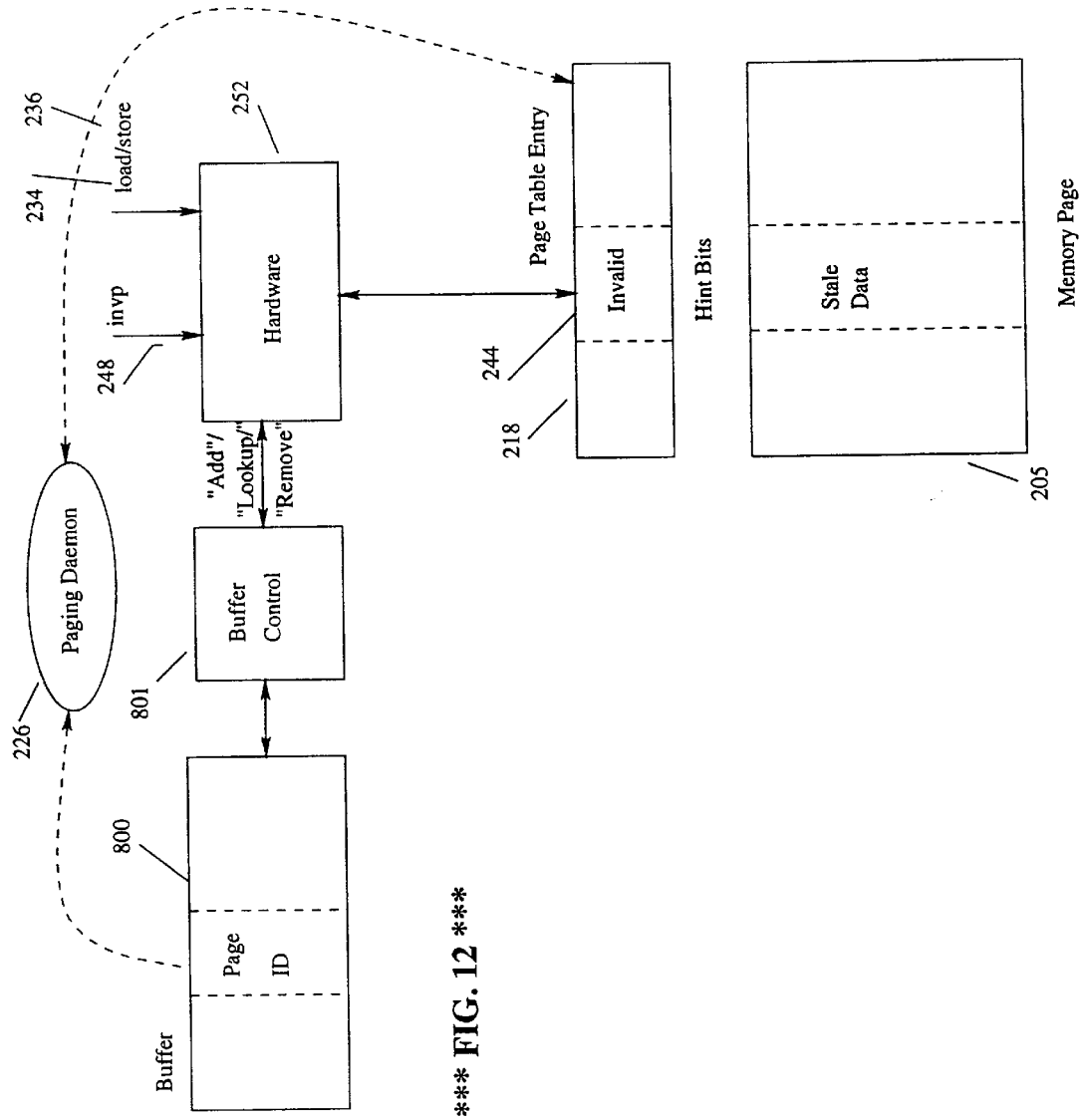
FIG. 12 is a block diagram showing the paging daemon inspecting the contents of the buffer and the state of hint bits kept in page tables.

FIG. 12 shows the interactions between the paging daemon (226) and the buffer (800). The paging daemon (226) retrieves an entry from the buffer (800) (if the buffer is not empty). The buffer entry contains a page ID. The page ID is used to locate an appropriate page table entry (218) with its hint bits (244). The hint bits are examined, the page table entry is modified appropriately, and the corresponding page is added to the free list.

Figure 15:
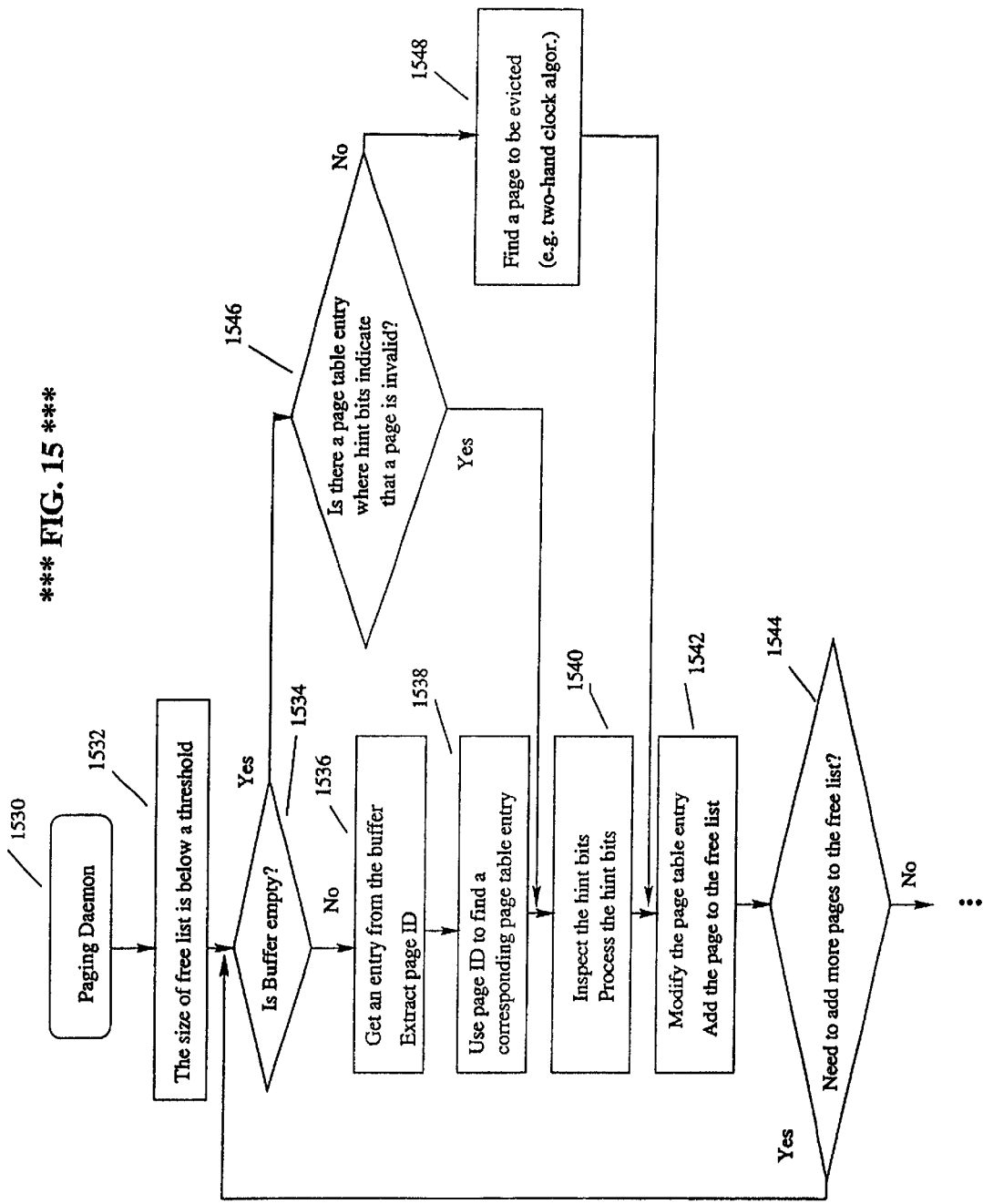
FIG. 15 is a flow chart showing how the hint bits and the buffer are utilized by the paging daemon.

The use of hint bits (214) and a buffer (800) is shown in FIG. 15. The paging daemon (1530) has to replenish the free list when the size of the free list falls below a certain threshold (1532). The buffer (800 of FIG. 8) is examined. If it is not empty (1534), the paging daemon retrieves an entry from the buffer and extracts the page ID from the buffer entry (1536). The page ID is used to find a corresponding entry in the page table (1538). The hint bits stored in the page table entry are inspected and processed accordingly (1540). The page table entry is modified as appropriate and the page is added to the free list (1542). This process repeats until the free list has a sufficient number of pages (1544). If the buffer is empty (1534), the paging daemon attempts to find a page table entry where the hint bits indicate that the page is invalid (1546). If such an entry is found, the paging daemon proceeds to the hint processing step (1540). Otherwise, a page to be evicted is located using a well-known algorithm (e.g. a two-hand clock algorithm) (1548). The located page is then added to the free list (1542).

Figure 17:
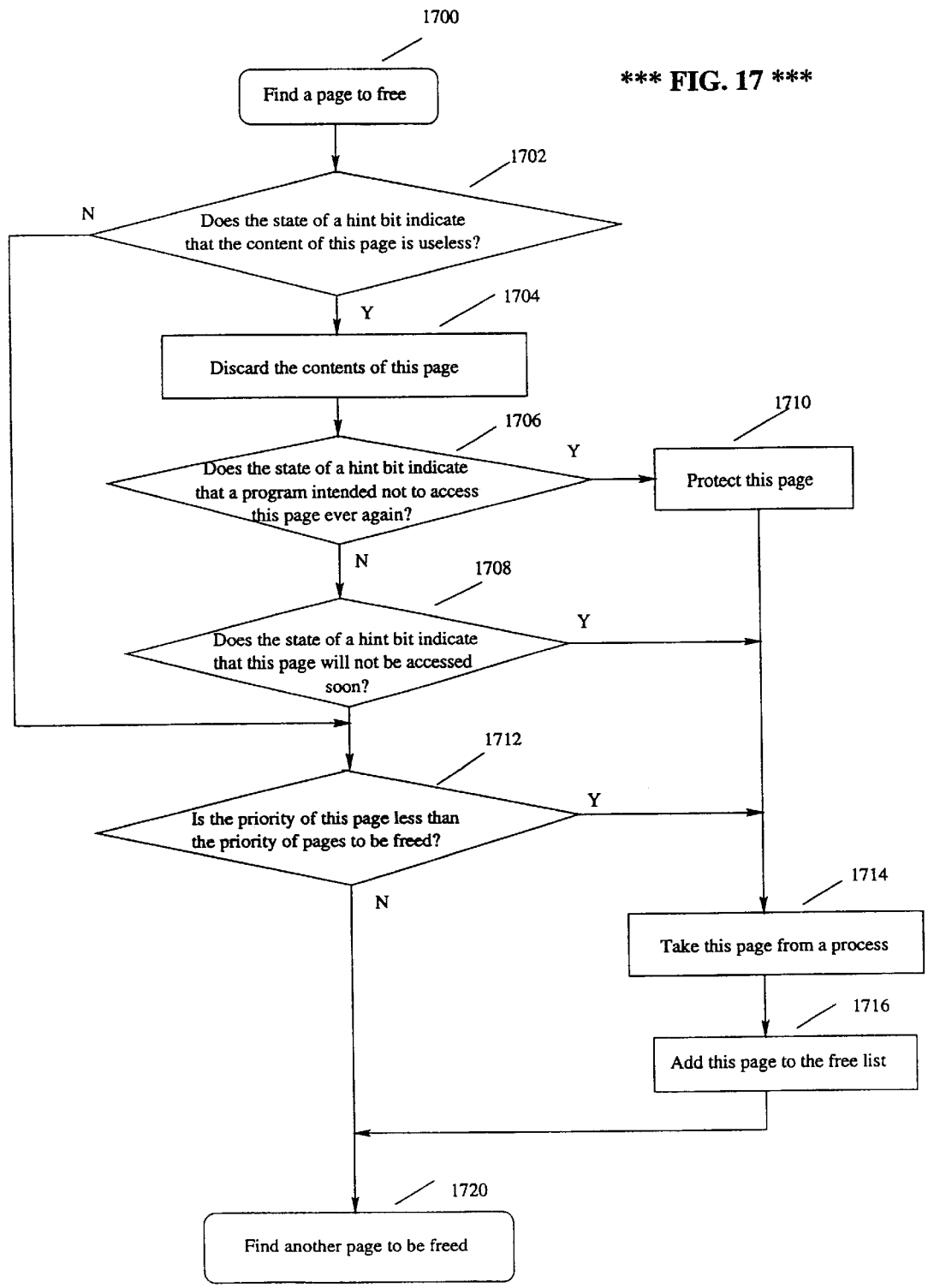
FIG. 17 is a flow chart showing how a system reacts to various hint bits when it needs to find a page that can be freed.

FIG. 17 is a flow chart showing how a system reacts to various hint bits when it needs to find a page that can be freed. A page to be freed is located (1700). It is then checked whether a hint bit indicates that the content of the page is useless (1702). If it is the case, the content of the page is discarded (1704) (i.e. the content of this page will not be saved to a disk or, more generally, the next level of memory hierarchy); otherwise, step (1712) is executed. It is then checked whether the program indicated previously that it will never access that page again (1706). If it is the case, this page is protected (1710) and taken from a process (1714). Otherwise, it is checked whether the program indicated that this page will not be accessed soon (1708). If it is the case, the page is taken away from the process (1714). Otherwise, it is checked whether the priority of this page is less than the priority of pages to be freed (1712) (to ensure that pages with low priority are freed first). If it is the case, the page is taken away from the process (1714). Otherwise, another page has to be found (1720). When a page is taken from a process (1714), it is added to the free list (1716). If necessary, more pages to be freed are located (1720).

Figure 13:
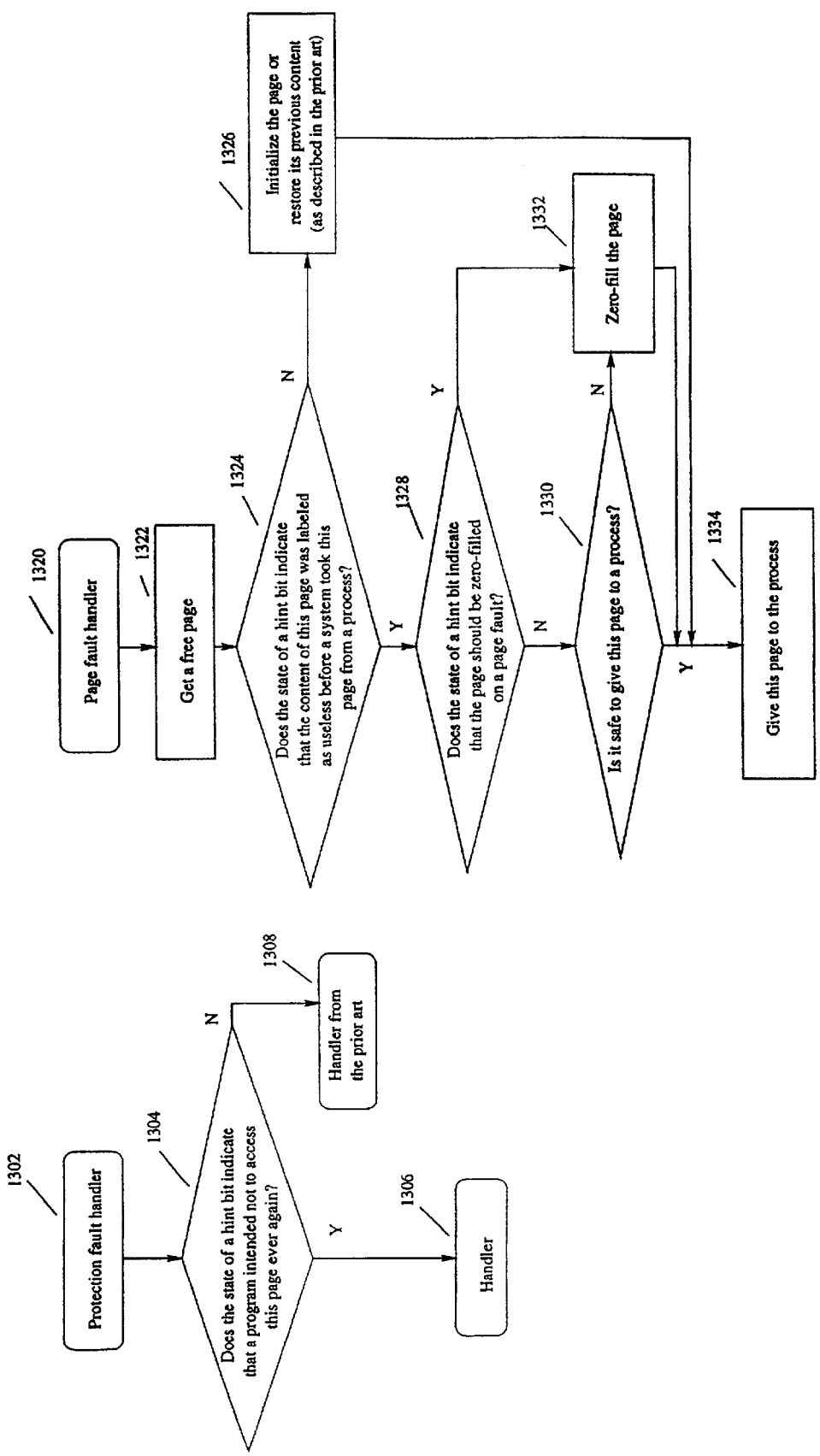
FIG. 13 is a flow chart showing how a system reacts to hint bis when it processes protection and page faults.

FIG. 13 is a flow chart showing how a system reacts to hint bits when it processes protection and page faults.

When a protection fault is generated (1302), the state of an appropriate hint bit is examined to see whether a program intended not to access this page ever again (1304). If this is the case, a special handler is invoked (1306). Otherwise, a standard handler (i.e. from the prior art) is invoked (1308).

When a page fault is generated (1320), a free page is obtained (1322). Then, the state of an appropriate hint bit is examined to see whether the contents of the page had been labeled as useless before the system took that page away from the process (1324). If it is not the case, the page is either initialized or its content is restored (1326) using the methods described in the prior art, after which the page is given to the process (1334). Otherwise, an appropriate hint bit is inspected to see whether a page is to be zero-filled on a page fault (1328). If this is not the case, it is checked whether it is safe to give this page filled with "random" data to a process (1330) (It is generally safe to do so if the data on that page were generated by the same process or thread); Otherwise, a page is zero-filled (1332). After that the page is given to the process (1334).

What follows is the description of how a method and an apparatus of the present invention are used by a data manager for managing data (e.g. stack and heap) pages in a compiler, a garbage collector, and a memory allocator.

A recursive function f( ) (500) in FIG. 5 may be allocating scratch space (possibly, a lot of space) on a stack for local variables (502) on every recursive call (518). Such a function, by calling itself repeatedly, can consume a lot of stack memory before reaching its base case (505). Eventually, after reaching its base case, such a function would start backtracking (508) all the way up to the place where the first call was made to it (543) and releasing a chunk of a stack memory at a time. At some point, a function would release all of the stack space it allocated during its execution (the content of that stack space is now useless). If at that point (545) the OS needs to initiate paging due to limited free memory resources, some of the "dirty" pages occupied by scratch data stored on the stack by the recursive function may have to be swapped out. Hence, some of the swapped out pages may have useless content. If an address corresponding to a swapped out page containing useless data is referenced again, the swapped out page is brought into memory. Hence, by invalidating each such a page containing useless data, it is possible to avoid swapping out a page and bringing that page into memory if the page is referenced again.

A non-recursive function (523) can allocate scratch space (possibly, a lot of space) (525) on a stack. Such a function can call some other function (528) which itself allocated space on a stack and can call other functions. When a function (523) returns, the stack space used by it and other functions it called during its execution, contains no useful data. This space can be invalidated. The pages marked as invalid need not be swapped out to a disk.

In addition, some stack data (513), such as the data whose scope (511–516) is a block (a compound statement), may become useless at the end of the block (516). The pages occupied by such useless data may be safely invalidated. These pages marked as invalid need not be swapped out to a disk.

The invention makes it possible to avoid the situation where the data rendered useless by the program semantics is swapped out unnecessarily (i.e. written back to the next level of memory hierarchy or an external storage device). Specifically, a compiler can generate code in an appropriate place (544) that will advise the OS that a certain range of addresses (e.g. beginning from the current top of the stack to the place where the stack was touched when the recursive function reached its based case) (508) does not have to be written back to the next level of memory hierarchy (should a page occupied by the scratch data be evicted) because the data stored there will no longer be used by an application. This optimization can be applied (547) to any function (not necessarily a recursive one) (523) that allocates space (possibly, a lot of space) on a stack. Similarly, stack pages occupied by data allocated in a block (a compound statement) can be invalidated at the end of that block (517).

Figure 9:
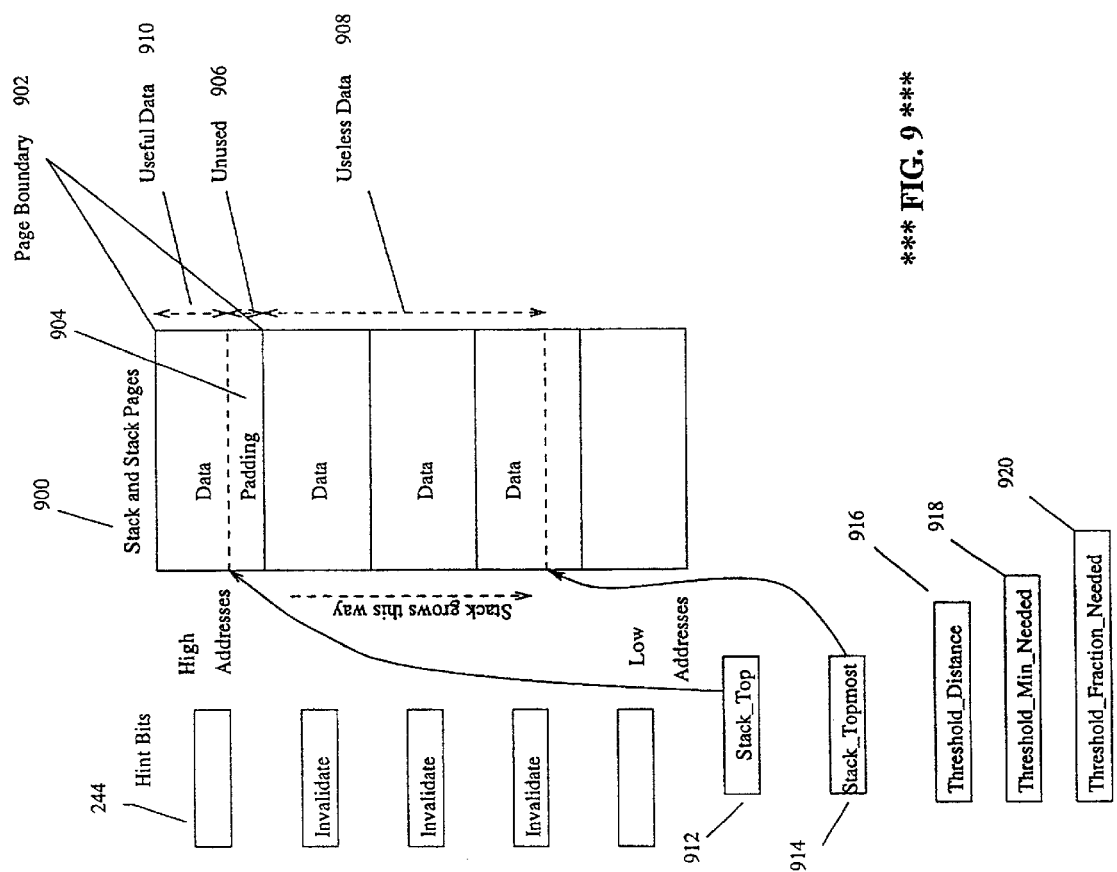
FIG. 9 is a block diagram showing the data structures of the present invention used for stack management.

Referring to FIG. 9, in accordance with the present invention, a modified version of a compiler is created.

A modified compiler is capable of aligning a stack (900) to a page boundary (902) by padding (904) the data. (Stack alignment may result in some portion of stack memory to be unused (906).) A page aligned stack can be used selectively, e.g. for some functions and blocks (compound statements) that are likely to allocate a lot of scratch space on the stack for temporary data. All pages containing such temporary data can be safely invalidated upon return from such a function or a block (at which point the temporary data become useless) (908). The hint bits (244) for such pages are set (to indicate what pages can be invalidated) using a method of the present invention. As described above, if an invalidated stack page is accessed again, (e.g. a program attempts to write to that page), an invalidation hint bit will be cleared by hardware as long as the page in question has not been taken away by the OS. Otherwise, a usual page fault will be generated and processed.

Stack alignment does not have to be performed (i.e. when stack data are not padded to a page boundary). In this case, it is possible that upon return from a function or a block, one of the stack pages is partially filled with useful (910) data and, therefore, cannot be invalidated. However, the remaining stack pages used by a function returning control are guaranteed to have only useless data and can be invalidated.

What follows is a method for invalidation of stack pages that can be supported by a compiler and other run-time software (e.g. alloca ( ) subroutine which allocates space on a stack). Consider a system where every thread (or a process) has its own local stack. We assume a contiguous allocation of stack space with, possibly, some padding (904) necessary for aligning data structures to certain boundaries (e.g. a word or a page (902)).

Figure 10:
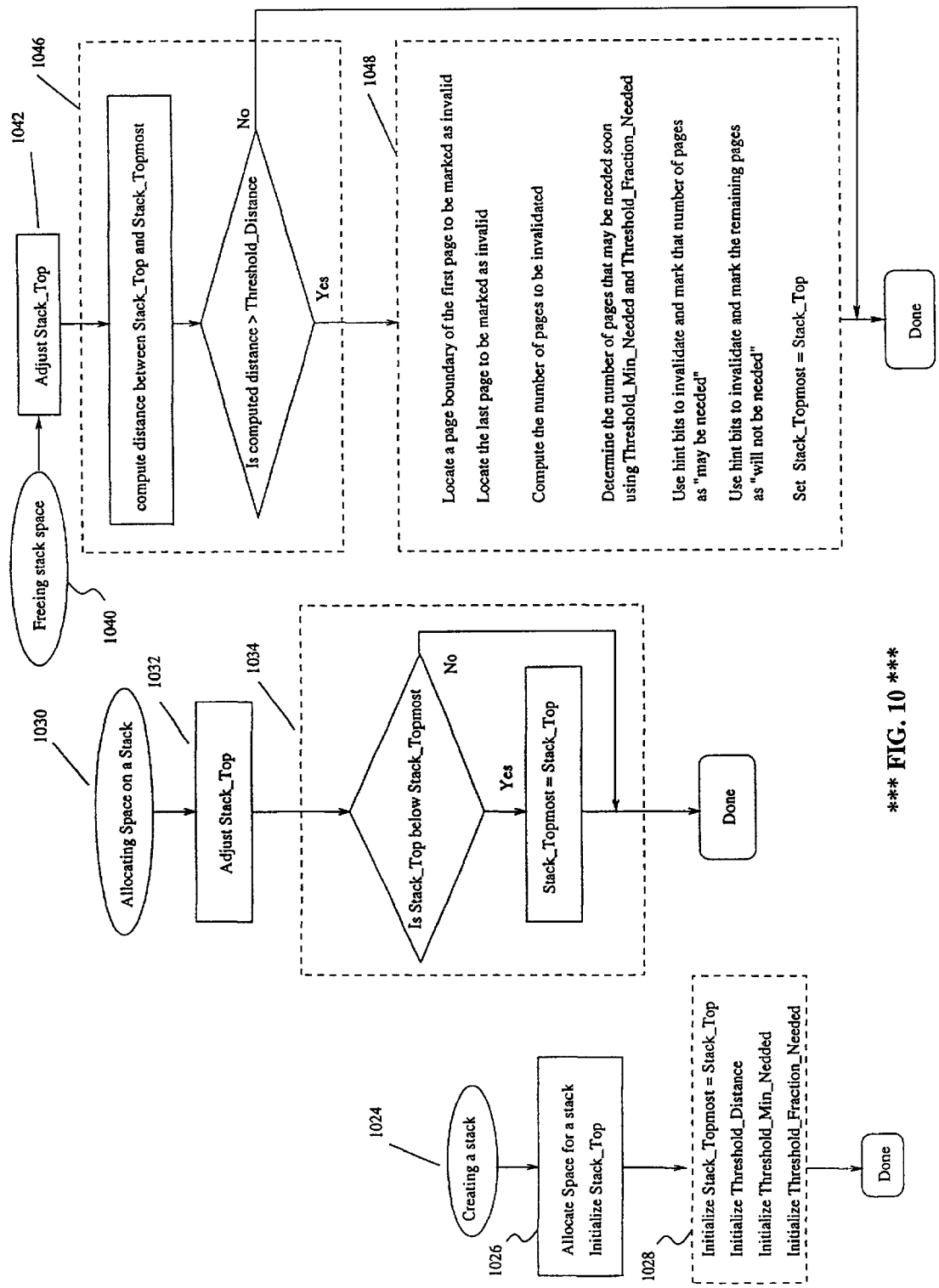
FIG. 10 are the flow charts showing the methods of creating a stack, allocating space on a stack, and freeing stack space, augmented as required by the present invention.

A stack has a global pointer associated with it—the stack_top pointer (912). It is initialized (1026) at start-up and points to the top of the stack. The stack_top pointer is adjusted whenever some data is pushed on (added to) the stack or popped off (removed from) the stack. See FIG. 10. A stack grows as more elements are added to it and shrinks when they are removed. We assume that a stack grows downward, i.e. from high addresses to low addresses. Those skilled in the art will realize that this scheme can be easily adapted to a system on which a stack grows in the opposite direction—namely, from low to high addresses.

Another global pointer, stack_topmost (914), is introduced. This pointer is associated with a stack. At start-up, it is initialized (1028) to point to the top of the stack. At runtime, this pointer is adjusted to point to the topmost location on a stack that is reached during an execution of a thread.

Several thresholds are introduced.

The value of threshold_distance (916) is associated with a stack. This threshold is initialized (1028) at start-up and is set to the distance (in bytes or words) between stack_top and stack_topmost pointers beyond which some stack pages are invalidated.

The value of threshold_min_needed (918) is associated with a stack. This threshold is initialized (1028) at start up and is set to the minimum number of pages that are marked (using hint bits) as "may be needed in the future" when stack pages are invalidated. The rest of the pages are marked (using hint bits) as "will not be needed in the future."

The value of threshold_fraction_needed (920) is associated with a stack. This threshold is initialized (1028) at start-up (to a number between 0 and 1) and indicates what fraction of invalidated pages are marked. (using hint bits) as "may be needed in the future." The rest of the pages are marked (using hint bits) as "will not be needed in the future."

In an alternate embodiment other thresholds are added as necessary. An alternate embodiment provides with a method for adjusting all thresholds at run time and/or at compile time.

The pointers and thresholds described above can be kept in hardware registers or in memory.

Usually, whenever a stack is created (1024), some space is allocated for a stack and stack_top pointer is initialized (1026)(this is a well-known technique used in the prior art). An additional step (1028) is added. In that step, the stack_topmost pointer and the thresholds described above are initialized.

Usually, whenever some space is allocated (1030) on a stack, the stack_top pointer is adjusted (1032) (this is a well-known technique used in the prior art). An additional step is added where the stack_topmost pointer is adjusted (1034). Namely, in that step the stack_topmost pointer is updated with the value of stack_top only if stack_top is below stack topmost.

Usually, whenever some stack space is freed (1040), the stack_top pointer is adjusted (1042) (this is a well-known technique used in the prior art). An additional step is added (1046). In that step, the distance between stack_top and stack_topmost is computed; then the computed distance is compared with the value of threshold_distance; if the computed distance exceeds threshold_distance (which means that a lot of stack space is filled with useless data and some stack pages may be invalidated to avoid unnecessary paging) an additional sub-step (1048) is performed. In that sub-step, the beginning (a page boundary) of the first page immediately below the stack_top pointer is located (this is the first page that will be marked as invalid). The last page is located using the stack_topmost pointer (this is the last page that will be marked as invalid). Then the number of pages to be invalidated is computed. This value is computed as the number of pages between (and including) the first page and the last page. This value is multiplied with threshold_fraction_need and the maximum of this product and threshold_min_needed is computed. The computed value is the number of contiguous pages starting from the first page (which is the closest to stack_top) to be invalidated and marked as "may be needed in the future." The remaining pages, if any, (all the way to the last page) are invalidated and marked as "will not be needed in the future."

Finally, the stack topmost is adjusted to point to the top of the stack.

In addition, an invalidated stack page can be marked as "fill with random data on a page fault." This is done to indicate that if an invalidated stack page is taken away and then subsequently referenced, a page-fault handler does not need to zero-fill a new stack page.

An alternate embodiment can execute various optimizations to determine what checks performed after the allocation and deallocation steps are redundant and what checks are indeed necessary. For example, the stack_topmost pointer does not have to be updated in a function that does not allocate a lot of space on a stack (or does not call other functions that allocate a lot of stack space). A leaf function, a function that does not call other functions, is a place to update the stack_topmost pointer. The deallocation check is not performed in a place where it is not expected that a significant amount of stack space (e.g. above threshold_distance) will be deallocated.

In accordance with another aspect of the present invention, those skilled in the art can modify a heap memory allocator and a compiler to make it possible to group objects that are expected to have the same lifetime and place such objects on the same page. When all of such objects become garbage (meaning they will not be needed again) and their memory is freed, an appropriate hint bit for such a heap page containing these objects can be set to indicate that this page can be invalidated and released. Such a page need not be copied to a disk. The same method can be used to deal with any individual large heap object (534,535). See FIG. 5. When such large object becomes garbage (537), all of the pages occupied by it are marked for invalidation using a method of the present invention (538) (i.e. using hint bits).

What follows is a method for invalidation of heap pages that can be supported by a compiler and run-time software (e.g. Heap allocation and deallocation routines).

In accordance with this invention, a compiler will analyze a program and try to group heap-allocated objects according to their lifetime. Those skilled in the art will be familiar with various techniques for determining a lifetime of an object. For some objects their life time cannot be determined at compile time.

Figure 11:
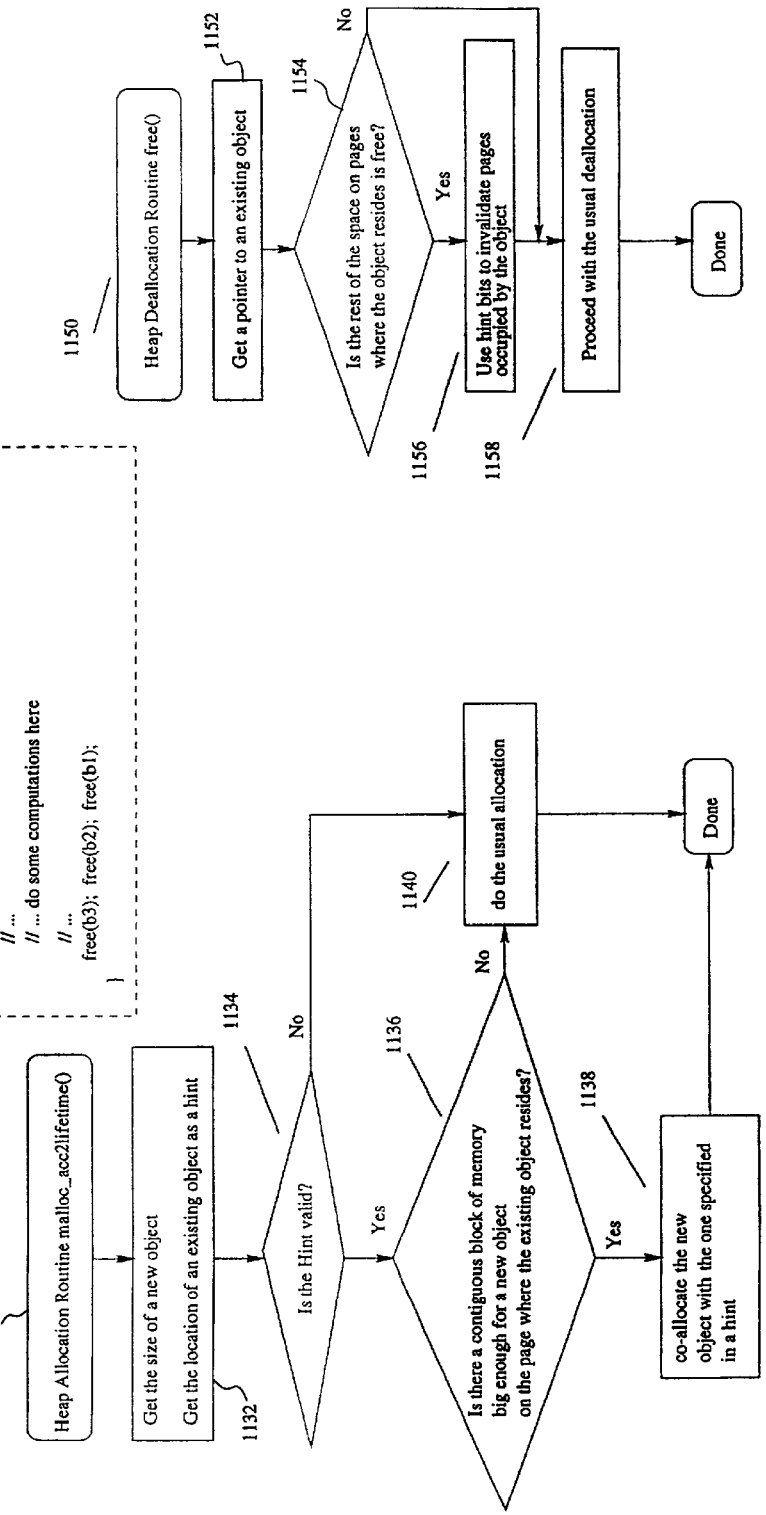
FIG. 11 are the flow charts showing the methods of allocating space on a heap according to the lifetime of objects and freeing heap space, augmented as required by the present invention.

Referring to FIG. 11, to address that, a programmer can supply a hint to a special heap allocation routine (1102) (e.g. malloc_acc2lifetime( )). A programmer-supplied hint (1104) is a pointer to an existing object (e.g. b1 in FIG. 11) whose lifetime is expected to be the same or close to the lifetime of a new object (e.g. b2 in FIG. 11). (A programmer-supplied hint takes a precedence over a compiler analysis.) If a programmer-supplied hint is a pointer to a special location in memory (1106) (e.g. a constant NULL pointer) a compiler will attempt to substitute it with the lifetime information it produced as the result of program analysis. If compiler analysis did not produce any information about the lifetime of a new object, it leaves a NULL pointer intact, in which case, a normal heap allocation (e.g. using a standard malloc ( ) subroutine) is performed. Hence, if either a programmer-supplied hint or a compiler-supplied hint is available, it is passed to a heap allocation routine as a parameter. Otherwise, a default behavior is assumed (e.g. when a NULL pointer is passed to a heap allocation routine as a hint). A compiler can also substitute a standard call to malloc ( ) (1108) with a call to a special heap allocation function (malloc_acc2lifetime) if it can infer the lifetime of a new object from program analysis. Both standard and the introduced heap allocation functions have an additional parameter which is the size of an object to be allocated.

A heap allocation subroutine (1130) (e.g. malloc_acc2lifetime( )), uses the size of a new object and the information supplied to it in a hint (i.e. a pointer to an existing object) (1132) to try to co-allocate an existing and a new object on the same page. A usual allocation (1140) (from the prior art) is performed when an invalid hint is supplied (1134) to a routine (e.g. a location supplied in a hint does not correspond to any heap allocated object). This routine examines available heap blocks to determine whether there is enough space for a new object on the page where an existing object resides (1136). If such a block is found, it is allocated for a new object (1138). Otherwise, a usual allocation is performed (1140).

The heap deallocation subroutine (1150) (e.g. free( )) is passed (1152) a pointer to a heap object whose memory is to be freed. This subroutine can determine whether the rest of the space on a page or pages occupied by this object is free and contains no useful objects (1154). If it is the case, all such pages are invalidated (1156) before the freed block is returned to the free pool of free heap space (1158).

In an alternate embodiment, various thresholds (e.g. similar to those described above for a stack) are implemented and used by a heap deallocation subroutine.

In an alternate embodiment, a heap deallocation routine invalidates a heap page and marks it as "protect and fault on access." This step will ensure that if a program attempts to access a page (any location within the address range of a page) through a dangling pointer, a protection fault will be generated. A heap allocation routine can ensure that a page in that address range is not allocated again until the process (or a thread) terminates. In another embodiment, a heap allocation routine will clear the protection hint bit (with some assistance from the OS) before allocating a page in this address range again to a process (or a thread) which used to own that page.

In an alternate embodiment, the method of the present invention is used with applications (programs) using pooled allocation. Such an application (program) allocates a pool of storage for objects whose lifetime is known not to exceed that of a program or some program region. Once the application (program) exits that region, the given pool of storage is deallocated, thus collectively freeing all the objects allocated from that pool. All freed pages are invalidated (using hint bits) to prevent them from being swapped out.

In an alternate embodiment, when a large object (whose size is comparable to a page or exceeds a page) is allocated, a heap allocation routine will place such an object on a separate page or a set of pages. When such an object is freed using free( ), the pages occupied by it are invalidated (as long as no other useful objects remain on a page). Those skilled in the art will be able to devise different hints and a different interface with heap management routines.

Referring to FIG. 6, in accordance with another aspect of this invention, a method of present invention can be used in copying garbage collectors (such as those that try to bring all reachable objects (602) closer to each other to conserve space and improve locality). A reachable object (602) is an object for which there exists a path to it from one of the global roots(600). An unreachable object (604) is the one for which such a path does not exist. A garbage collector can instruct the OS (by setting appropriate hint bits) that certain pages (608) in heap memory do not contain any useful information because the remaining objects contained in those pages are not reachable (and are therefore dead (610) objects—no longer live). A garbage collector can safely invalidate a page from which all reachable objects have been relocated.

What follows is a method for invalidation of heap pages that can be supported by a copying garbage collector.

Usually, a copying garbage collector (630) (GC) performs a number of steps necessary to relocate all useful reachable objects. In the simplest form, a GC needs to find a reachable object that has not been relocated (632), relocate it to another place in memory (634) (from so-called "from space" to so-called "to-space"), and leave some forwarding information (636) in place of a relocated object for those objects that still point to an old location of the object that has just been relocated. A GC repeats these steps for all reachable objects (638). Finally, it declares that the region of memory from which the objects have been copied from (i.e. "from space") is free again (640).

In accordance with this invention, an additional step is added. Before a region of memory is declared free, every page in that region is invalidated (650). This will prevent many pages from being swapped out even in the presence of memory pressure. If the pages have already been swapped out, they will be marked as invalid and the OS will free the underlying resources (as described above).

In an alternate embodiment (e.g. with a generational copying garbage collector) several thresholds (similar to those described for a stack) are implemented and used by a GC. For example, one threshold may specify what fraction of invalidated pages are marked as "may be needed soon" (the remaining invalidated pages are marked as "will not be needed soon").

In an alternate embodiment, a garbage collector invalidates a page as soon as it concludes that a page contains no useful data and no object references any location on such a page. In other words, a garbage collector does not have to wait until all reachable objects have been copied from all pages.

Figure 7:
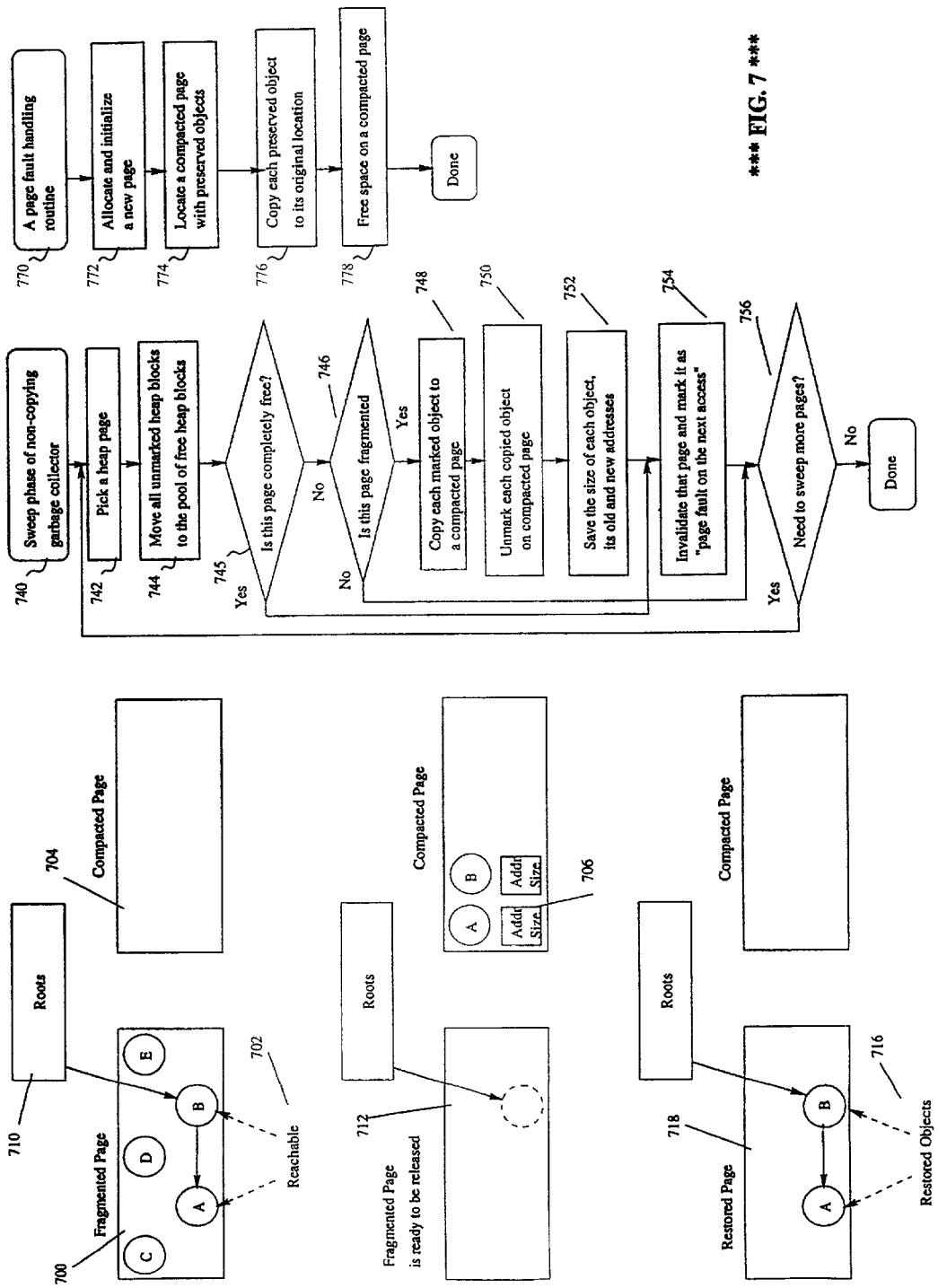
FIG. 7 is a block diagram showing the use of a method of the present invention with a non-copying garbage collector.

In accordance with another aspect of this invention, a method of present invention can be used by a non-copying garbage collector (GC) which does not move objects (e.g. a conservative GC). It is known to those skilled in the art that a non-copying garbage collector may cause heap fragmentation. In the marking phase, such a GC starts from the roots (710) and marks all reachable objects. See FIG. 7. At the end of the marking phase, the location and the size of every reachable object within any heap page is known to a garbage collector. (A conservative non-copying garbage collector can also mark some unreachable objects as reachable.)

In accordance with the present invention, during a sweep phase (when unmarked heap blocks are returned to the pool of free heap space) a fragmented page is located. All objects marked as reachable (702) on a fragmented page (700) are compacted and moved temporarily to some compacted page (704) as long as their former location and the new location (706) are preserved and are known to the run-time software and a garbage collector. A fragmented page whose reachable objects were safely relocated (712) is marked (using the hint bits) to be invalidated and released (such a page will not need to be copied back to a disk when the OS initiates paging). If that page is referenced in the future, a page fault will be generated and the run-time software will restore objects (716) by moving them back from the compacted page (704) to their original locations within a new page (718).

What follows is a method for invalidation of heap pages that can be supported by a conservative (non-copying) garbage collector.

In a sweep phase, a non-copying GC (740) performs a number of steps necessary to move all unmarked heap blocks back to the pool of free heap space and un-mark all marked objects. Usually a heap memory is scanned sequentially—a page after a page.

In accordance with this invention, several additional steps are performed right-after all unmarked heap blocks on a page (742) are located and added to the pool of free heap blocks (744). In one of these steps, it is tested whether a page is completely free (745). If a page is free, it is invalidated and released (using a method of the present invention) by setting a "page fault on the next access" hint bit (754) (in an alternate embodiment, other hint bits are set). Else (i.e. if a page is not free), it is tested whether a page is fragmented (746). (Various methods can be used to determine whether a page is fragmented. For example, if a ratio of an average size of a free block on a page to the amount of free space on a page is below a certain threshold (i.e. many small free blocks), a page is declared to be fragmented.) If a page is fragmented, each object residing on this page that is marked as reachable is copied (748) to some location in heap memory—a compacted page. An object is unmarked (on a compacted page) while it is copied (750). The size, the original and the new addresses of each copied object are preserved (752). Then a page is invalidated and released (using a method of the present invention) by setting a "page fault on the next access" hint bit (754). The process is repeated for all heap pages (756).

When an invalidated page is referenced again, a page fault is generated, a new page is allocated (772) (and initialized, if it is necessary), and a special routine (770) performs several steps necessary to restore the content of a page being accessed. Specifically, given a page being accessed, this routine locates (774) a compacted page where the objects have been preserved. It copies (776) each preserved object to its original location on a new page. The freed (778) space on a compacted page can be used for compacting other objects in the future.

In an alternate embodiment, some pages are not compacted even if they are fragmented. Such a page is labeled to indicate that it should not be compacted.

The following is an exemplary specification for an instruction 'invp' controlling hint bits and a high level subroutine 'inv_pages( )' using such an instruction.

inv_pages( ) Subroutine

Purpose

Gives hints to the the OS and the paging daemon that an application will not need the data stored in the specified page(s).

Syntax int inv_pages(addr, hints, n_of_pages)
void * addr;
unsigned hints;
unsigned n_of_pages.

The inv_pages subroutine permits a process to inform the OS and the paging daemon that the content of the specified pages is no longer needed.

The pages specified in the call to this subroutine can be invalidated.

In some cases the paging space may be freed by the system.

The flags supplied to the subroutine indicate whether a process will need the corresponding pages in the near future, what should be done if those pages are accessed again, and how the pages should be initialized when they are accessed again by a process.

Parameters addr specifies the starting (virtual) address of the first page.

The address must be a multiple of the page size (returned by the sysconf( ) subroutine using the _SC_PAGE_SIZE value for the Name parameter).

hints

Specifies expected paging behavior.

The following values for the hints parameter are defined:

INV_PG_PROTECT_SEGFAULT_ON_ACCESS.

The contents of the pages is useless and can be discarded.

The system should mark the corresponding pages as unmodified (clean), so that they are not paged out unnecessarily in case the system gets low on memory.

A process will NEVER access these pages again.

If a process accesses the pages again, a protection fault will be generated.

This hint CANNOT be ignored by the system.

This hint CANNOT be combined with other hints.

INV_PG_WONT_NEED_SOON.

The contents of the pages is useless and can be discarded.

The system should mark the corresponding pages as unmodified (clean) so that they are not paged out unnecessarily in case the system gets low on memory.

A process is unlikely to reference these pages in the near future and the system CAN take the page away form a process.

If the pages are not taken away and a process accesses them again, no page faults are generated.

If the pages are taken away and a process accesses the pages again, page faults will be generated and the new page frames will be ZERO_FILLed unless requested otherwise.

This hint and INV_PG_MAY_NEED_SOON hint are mutually exclusive.

This hint can be ignored by the system.

INV_PG_MAY_NEED_SOON.

The contents of the pages is useless and can be discarded.

The system should mark the corresponding pages as unmodified (clean) so that they are not paged out unnecessarily in case the system gets low on memory.

A process is likely to reference these pages in the near future and the system SHOULD NOT take the pages away form a process if it is possible.

If the pages are not taken away and a process accesses them again, no page faults are generated.

If the pages are taken away and a process accesses the pages again, page faults will be generated and the new page frames will be ZERO-FILLed unless requested otherwise.

This hint and INV_PG_WONT_NEED_SOON are mutually exclusive.

This hint can be ignored by the system.

INV_PG_PAGE_FAULT_WHEN_ACCESSED.

This hint is to be used in combination with one of the following hints:
INV_PG_WONT_NEED_SOON
INV_PG_MAY_NEED_SOON.
If none of these hints is specified, INV_PG_WONT_NEED_SOON hint is used by default.

This hint instructs the system to make sure that when a process accesses the specified pages again, page faults will be generated.

The new page frames will be
ZERO-FILLed unless requested otherwise.
If this hint is used with INV_PG_MAY_NEED_SOON, the system may choose to prepare (zero-fill) a new page frame before a page fault.

This hint CANNOT be ignored by the system.
INV_PG_ZERO_FILLED.

This hint instructs the system that a process requires a ZERO-FILLed page if an access to a page causes a page fault.

This is a default system behavior.
This hint CANNOT be ignored by the system.
INV_PG_RNDM_FILLED.

This hint instructs the system that a process does not require a ZERO-FILLed page if an access to a page causes a page fault.

The new page frames may contain any (random) data.
For security reasons the operating system will have to ensure that a page containing random data was "stolen" from the same process or the same thread.

This hint can be ignored by the system
n_pages.

Specifies the number of contiguous pages (including the first one) to be invalidated. If n_pages is 0, the subroutine returns to the calling program with the return value 0.

Return Values
When successful, the inv_pages subroutine returns 0. Otherwise, it returns -1 and sets the errno global variable to indicate the error.

Error Codes
If the inv_pages subroutine is unsuccessful, the errno global variable can be set to one of the following values:
EALIGN The addr parameter specifies an address that is not page-aligned.
EPRTCT A process does not have permission to access one of the pages.
EHINTS The hints parameter is invalid.
ECOMBN Invalid combination of hints.

Implementation Specifics
The purpose of inv_pages subroutine is to give hints to the system.

Some of the hints supplied by this routine can be safely ignored by the system (for example, when enough physical memory is available) only if it does not break the semantics of an application.

Some hints cannot be ignored. For example, if an application expects to get a zero-filled page or a protection violation on the next access but the OS ignores such a request, it will break the semantics of an application.

Related Information
The sysconf( ) subroutine.
invp (Invalidate a Page) Instruction
Purpose
Sets appropriate hint-bits for a page containing the word addressed in the page table.
Syntax
invp RA, RB

DESCRIPTION

The state of the hint-bits set by this instruction can be examined by the OS and a paging daemon and may be used to improve virtual memory performance.

The invp instruction may improve performance of a system by specifying the pages that can be replaced earlier and the pages with useless contents that do not have to be paged out.

When the system is running low on memory, it will try to examine the contents of the hint-bits first to find the pages that can be added to the free list.

The invp instruction obtains an effective address (EA) from a general-purpose register. (GPR) RA.

If the page table (PT) has an entry corresponding to the page containing the target storage locations, the appropriate hint-bits are set in that entry using the contents of a GPR RB.

The contents of a GRP RB is treated as follows:
Note: a correspondence to the 'hints' parameter of inv_pages( ) subroutine is shown in parenthesis.
bit 0 (-/INV_PG_PROTECT_SEGFAULT_ON_ACCESS)
  0—Reserved.
  1—The page is invalidated; it is expected that the page will never be accessed in the future; if the page is accessed again, a protection fault MUST be generated; the contents of other bits will be ignored
bit 1 (INV_PG_WONT_NEED_SOON/INV_PG_MAY_NEED_SOON)
  0—The page is invalidated;
  it is expected that the page will not be referenced in the nearest future;
  if the page is not taken away and a page is accessed again, the corresponding hint-bit is cleared in hardware to prevent the system from evicting the page;
  if the page is taken away and a page is accessed again, a page fault will be generated and the new page frame will be filled with zeroes unless requested otherwise.
  1—The page is invalidated;
    it is expected that the page will be referenced in the nearest future;
    if the page is taken away and a page is accessed again; a page fault will be generated and the new page will be filled with zeroes unless requested otherwise.
bit 2 (-/INV_PG_PAGE_FAULT_WHEN_ACCESSED)
  0—Reserved.
  1—It is expected that when this page is referenced again, a page fault WILL be generated and the new page will be filled with zeroes unless requested otherwise.
bit 3 (INV_PG_ZERO_FILLED/INV_PG_RNDM_FILLED).
  0— The system MUST zero-fill a page frame
    if the next reference to that page causes a page fault to be generated.
  1—The system MAY fill a page frame with any (random) data,
    if the next reference to that page causes a page fault to be generated.

All other bits are reserved and should be set to zero.

If the PT does not have an entry corresponding to the page in question, the instruction is treated as a no-op.

(In another embodiment, the instruction generates a page fault.)

The invp instruction is treated as a load from the addressed page with respect to protection.

If protection does not permit access to the addressed word, the invp instruction performs no operations.
Parameters
RA Specifies the source general-purpose register; contains the EA of a word on a page.

RB Specifies the source general-purpose register; contains hint-bits.

Security

The invp instruction can be used in both the user and the privileged mode.

Implementation specifics

Some hints are mandatory (such as those affecting protection) and cannot be ignored. When such a hint is specified, the corresponding TLB entry (or entries) must be flushed to ensure the correct program behavior.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of managing memory in a computer system, said method comprising:
   a) maintaining at least one hint bit in an address translation table, said hint bit providing information to a first process about the future use of a corresponding memory portion in said memory by a second process associated with said memory portion; and
   b) managing said memory portion in response to said information provided by said hint bit.

2. A method according to claim 1, wherein the state of said hint bit is controlled using a non-privileged instruction.

3. A method according to claim 1, wherein the translation table is comprised of at least one of the following:
   a) a page table; and
   b) a translation look-aside buffer.

4. A method according to claim 1, wherein a first process includes an operating system of the computer system.

5. A method according to claim 1, wherein said memory portion includes a memory page.

6. A method according to claim 1, further comprising:
   a buffer comprised of at least one entry wherein said entry includes a memory portion identification for a memory portion having its corresponding hint bit set to a preselected state; and
   wherein said buffer is used by a first process to identify said portion of memory with information provided by said hint bit.

7. A method according to claim 1, wherein:
   said hint bit information indicates that said memory portion will never again be referenced by a second process currently associated with said memory portion; and
   said managing step in response to the information in said hint bit includes disassociating said memory portion from a second process.

8. A method according to claim 1, wherein:
   said hint bit information indicates that said memory portion is not likely to be referenced in the future by a second process currently associated with said memory portion; and
   said managing step in response to the information in said hint bit includes disassociating said memory portion from a second process.

9. A method according to claim 1, wherein:
   said hint bit information indicates that said memory portion is not likely to be referenced in the future by a second process currently associated with said memory portion; and
   said managing step in response to the information in said hint bit includes disassociating said memory portion from a second process if available memory space is below a threshold.

10. A method according to claim 1, wherein:
    said hint bit information indicates that said memory portion is likely to be referenced in the future by a second process currently associated with said memory portion; and
    said managing step in response to the information in said hint bit includes not disassociating said memory portion from a second process unless available memory space is below a threshold.

11. A method according to claim 1, wherein:
    said hint bit information indicates that said memory portion has no useful data for a second process currently associated with said memory portion; and
    said managing step in response to the information in said hint bit includes;
    disassociating of said memory portion assignment before disassociating of another memory portion assignment from a second process if the hint bit information for said other memory portion indicates that said other memory portion has useful data.

12. A method according to claim 1, wherein:
    said hint bit information indicates that said memory portion has no useful data for a second process currently associated with said memory portion; and said managing step in response to the information in said hint bit includes discarding the data in said memory portion even if said memory portion has been modified.

13. A method according to claim 1, wherein:
    when a first process is disassociating said memory portion, checking whether said hint bit information indicates that said memory portion has no useful data for a second process currently associated with said memory portion; and
    if said hint bit information indicates that said memory portion has no useful data for a second process currently associated with said memory portion; then said managing step in response to the information in said hint bit includes discarding the data in said memory portion even if said memory portion has been modified.

14. A method according to claim 1, wherein:
    when a memory portion fault is generated, handling said memory portion fault includes checking whether said hint bit information indicates whether and how a memory portion is to be initialized on a memory portion fault; and
    if said hint bit information indicates whether and how said memory portion is to be initialized on a memory portion fault; then
    said managing step in response to the information in said hint bit includes initializing a memory portion according to the information indicated by said hint bit.

15. A method according to claim 1, wherein:
    when a second process references a memory portion, checking whether said hint bit information indicates that said memory portion has no useful data for said second process associated with said memory portion; and if said hint bit information indicates that said memory portion has no useful data for said second process associated with said memory portion; then changing the information in said hint bit to indicate that said memory portion has useful data.

16. A method according to claim 15, wherein said reference is a store operation.

17. A method according to claim 15, wherein said change is accomplished simply as a result of said second process referencing said memory portion and without involving a first process.

18. A method according to claim 1, wherein:
when a second process references a memory portion, checking whether said hint bit information indicates that
said memory portion is not likely to be referenced in the future by said second process associated with said memory portion; and
if said hint bit information indicates that said memory portion is not likely to be referenced in the future by said second process associated with said memory portion; then changing the information in said hint bit to indicate that said memory portion is likely to be referenced in the future.

19. A method according to claim 18, wherein said change is accomplished simply as a result of said second process referencing said memory portion and without involving a first process.

20. A method according to claim 1, wherein:
when a second process references a memory portion, checking whether said hint bit information indicates that
said memory portion has no useful data for said second process associated with said memory portion; and
if said hint bit information indicates that said memory portion has no useful data for said second process associated with said memory portion; then generating a memory portion fault and handling a memory portion fault according to claim 14.

21. A method according to claim 20, wherein said reference is a load operation.

22. A method according to claim 1, wherein for a memory portion that is a part of heap space and is identified as having only unreachable objects, a hint bit is set to indicate that said memory portion has no useful data.

23. A method according to claim 1, wherein for a memory portion that is a part of heap space and is identified by a garbage collector as having only unreachable objects, a hint bit is set by a garbage collector to indicate that said memory portion has no useful data.

24. A method according to claim 1, wherein upon deallocation of a memory portion that is a part of heap space, said hint bit is set (by a second process code) to indicate that said memory portion has no useful data.

25. A method according to claim 1, wherein upon reclamation of a memory portion that is a part of stack space said hint bit is set (by a second process code) to indicate that said memory portion has no useful data.

26. A method according to claims 1, wherein when the number of memory portions for which a hint bit is set to indicate that said memory portions have no useful data, exceed a certain threshold, then for a fraction of said memory portions a hint bit is set to indicate that said memory portions are likely to be referenced soon, while for the other fraction of said memory portions a hint bit is set to indicate that said other memory portions are not likely to be referenced soon.

27. A method according to claim 1, wherein when a second process references a memory portion in a first level of a memory hierarchy, and said memory portion is not available in said first level of a memory hierarchy, but is available in a second level of memory hierarchy; and if said hint bit information indicates that said memory portion has no useful data; then said managing step in response to the information in said hint bit includes
freeing said memory portion in said second level of memory hierarchy, and not transferring the content of said memory portion to said first level of memory hierarchy; and
wherein said first level of memory hierarchy is closer to a processor than said second level of a memory hierarchy; and
wherein the freeing step is comprised of at least one of the following
a) invalidating said memory portion,
b) deallocating a resource associated with said memory portion.

28. In a computer system having a hierarchical memory structure, with said structure having at least a first level of memory (closer to a processor) and a second level of memory (further away from a processor), a method of reducing write backs of data from said first level of memory to said second level of memory, and a method of reducing the number of reads, from said second level of memory to said first level of memory, said method comprising:
maintaining at least one hint bit in an address translation table of said memory structure, said hint bit for indicating that data in a corresponding memory portion is useless; and
discarding data in said memory portion in a first level of memory when said hint bit corresponding to said memory portion indicates that said data is useless, whereby said useless data is not written back to said second level of memory, discarding data in said memory portion in a second level of memory when said hint bit corresponding to said memory portion indicates that said data is useless, whereby said useless data is not read into said first level of memory and said data is invalidated in said second level of memory.

29. A method as recited in claim 28, wherein said first level of memory comprises a random access memory, and
said second level of memory comprises a hard drive.

30. A method as recited in claim 28, wherein said first level of memory comprises a random access memory, and said second level of memory comprises a random access memory.

31. Apparatus for managing memory in a computer system, said apparatus comprising:
a) an address translation table for maintaining at least one hint bit, said hint bit providing information to a first process about the future use of a corresponding memory portion in said memory by a second process associated with said memory portion; and
b) means for managing said memory portion in response to said information provided by said hint bit.

32. Apparatus according to claim 31, wherein the state of said hint bit is controlled using a non-privileged instruction.

33. Apparatus according to claim 31, wherein the translation table is comprised of at least one of the following:
a) a page table; and
b) a translation look-aside buffer.

34. Apparatus according to claim 31, further comprising:
a buffer comprised of at least one entry wherein said entry includes a memory portion identification for a memory portion having its corresponding hint bit set to a preselected state; and wherein said buffer is used by a first process to identify said portion of memory with information provided by said hint bit.

35. Apparatus according to claim 31, wherein:

when a memory portion fault is generated, handling said memory portion fault includes checking whether said hint bit information indicates whether and how a memory portion is to be initialized on a memory portion fault; and if said hint bit information indicates whether and how said memory portion is to be initialized on a memory portion fault; then said managing means includes means for initializing a memory portion according to the information indicated by said hint bit.

36. Apparatus according to claim 31, further comprising:

means for checking, when a second process references a memory portion, whether said hint bit information indicates that said memory portion has no useful data for said second process associated with said memory portion; and means for changing the information in said hint bit to indicate that said memory portion has useful data, if said hint bit information indicates that said memory portion.

37. Apparatus according to claim 31, further comprising:

means for checking, when a second process references a memory portion, whether said hint bit information indicates that said memory portion is not likely to be referenced in the future by said second process associated with said memory portion; and means for changing the information in said hint bit to indicate that said memory portion is likely to be referenced in the future, if said hint bit information indicates that said memory portion is not likely to be referenced in the fixture by said second process associated with said memory portion.

38. Apparatus according to claim 31, further comprising:

means for checking, when a second process references a memory portion, whether said hint bit information indicates that said memory portion has no useful data for said second process associated with said memory portion; and means for generating a memory portion fault and handling a memory portion fault according to claim 35, if said hint bit information indicates that said memory portion has no useful data for said second process associated with said memory portion.

39. Apparatus according to claim 31, wherein when the number of memory portions for which a hint bit is set to indicate that said memory portions have no useful data, exceed a certain threshold, then for a fraction of said memory portions a hint bit is set to indicate that said memory portions are likely to be referenced soon, while for the other fraction of said memory portions a hint bit is set to indicate that said other memory portions are not likely to be referenced soon.

40. Apparatus according to claim 31, wherein when a second process references a memory portion in a first level of a memory hierarchy, and said memory portion is not available in said first level of a memory hierarchy, but is available in a second level of memory hierarchy, and if said hint bit information indicates that said memory portion has no useful data; then said managing means includes means for freeing said memory portion in said second level of memory hierarchy, and not transferring the content of said memory portion to said first level of memory hierarchy; and wherein said first level of memory hierarchy is closer to a processor than said second level of a memory hierarchy; and wherein the freeing means is comprised of at least one of the following
a) means for invalidating said memory portion,
b) means for deallocating a resource associated with said memory portion.

41. In a computer system having a hierarchical memory structure, with said structure having at least a first level of memory (closer to a processor) and a second level of memory (further away from a processor), apparatus for reducing write backs of data from said first level of memory to said second level of memory, and for reducing the number of reads, from said second level of memory to said first level of memory, said apparatus comprising:

means for maintaining at least one hint bit in an address translation table of said memory structure, said hint bit for indicating that data in a corresponding memory portion is useless; and means for discarding data in said memory portion in a first level of memory when said hint bit corresponding to said memory portion indicates that said data is useless, whereby said useless data is not written back to said second level of memory.

42. A program storage device readable by a machine, tangibly embodying a program of instructions executable by the machine to perform method steps for managing memory in a computer system, said method steps comprising:

a) maintaining at least one hint bit in an address translation table, said hint bit providing information to a first process to about future use of a corresponding memory portion in said memory by a second process associated with said memory portion; and b) managing said memory portion in response to said information provided by said hint bit.

43. A program storage device according to claim 42, wherein the state of said hint bit is controlled using a non-privileged instruction.

* * * * *

UNITED STATES PATENT AND TRADEMARK OFFICE
CERTIFICATE OF CORRECTION

PATENT NO. : 6,886,085 B1
APPLICATION NO. : 09/636049
DATED : April 26, 2005
INVENTOR(S) : Shuf et al.

It is certified that error appears in the above-identified patent and that said Letters Patent is hereby corrected as shown below:

Column 5, Line 56:
"discarded. (invalidated), and" should read --discarded (invalidated), and--

Column 7, line 42:
"in hint bits.) to" should read --in hint bits) to--

Column 9, Line 19:
""P_O...P_N(100...105)." should read --"P_O..P_N (100..105).--

Column 10, Lines 22-23:
"(228...229)" should read --(228..229)--

Column 10, Line 28:
"bit (229) IF a" should read --bit (229). If a--

Column 13, Lines 39-40:
"protection. (those)" should read --protection (those)--

Column 14, Line 21:
"to find thee" should read --to find the--

Column 14, Line 27:
"a page table.) in one" should read --a page table.) ¶ In one--

Column 18, Line 11:
"the stacktopmost is" should read --the stack topmost is--

Column 21, Line 17:
"right-after" should read --right after--

Column 21, Lines 55-56:
"using such an instruction. inv_pages () subroutine"

should read

--using such an instruction.
------------------------------------------------------------
--------- inv_pages () Subroutine--

UNITED STATES PATENT AND TRADEMARK OFFICE
CERTIFICATE OF CORRECTION

PATENT NO. : 6,886,085 B1
APPLICATION NO. : 09/636049
DATED : April 26, 2005
INVENTOR(S) : Shuf et al.

It is certified that error appears in the above-identified patent and that said Letters Patent is hereby corrected as shown below:

Column 21, Lines 64-65:
"n_of_pages." should read --n_of_pages; ¶ Description--

Column 23, Lines 57-58:
"The sysyconf() subroutine. Invp (Invalidate a Page) Instruction"

should read

--The sysconf() subroutine.
--------------------------------------------------------------------------
------------------------
Invp (Invalidate a Page) Instruction--

Column 24, Line 9:
"register.(GPR)" should read --register (GPR)--

Column 24, Line 23
"be ignored ¶ bit 1" should read --be ignored. ¶ bit 1--

Column 26, Line 20, Claim 11:
"hint bit includes;" should read --hint bit includes: --

Column 29, Line 25, Claim 36:
"memory portion" should read --memory portion has no useful data for said second process associated with said memory portion--

UNITED STATES PATENT AND TRADEMARK OFFICE
CERTIFICATE OF CORRECTION

PATENT NO. : 6,886,085 B1
APPLICATION NO. : 09/636049
DATED : April 26, 2005
INVENTOR(S) : Shuf et al.

It is certified that error appears in the above-identified patent and that said Letters Patent is hereby corrected as shown below:

Column 29, Line 36, Claim 37:
"in the fixture" should read --in the future--

Column 30, Line 47, Claim 42:
"process to about future" should read --process about future--

Signed and Sealed this

Eighth Day of August, 2006

JON W. DUDAS
*Director of the United States Patent and Trademark Office*